US009390574B2

(12) United States Patent
Jones et al.

(10) Patent No.: US 9,390,574 B2
(45) Date of Patent: Jul. 12, 2016

(54) DOCUMENT PROCESSING SYSTEM

(75) Inventors: John E. Jones, Winnetka, IL (US); Paul A. Jones, Glenview, IL (US); William J. Jones, Barrington, IL (US); Ronald M Gafron, Hoffman Estates, IL (US); Douglas U. Mennie, Barrington, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 855 days.

(21) Appl. No.: 13/014,823

(22) Filed: Jan. 27, 2011

(65) Prior Publication Data

US 2011/0206267 A1    Aug. 25, 2011

Related U.S. Application Data

(60) Continuation of application No. 12/177,702, filed on Jul. 22, 2008, which is a continuation of application No. 12/025,661, filed on Feb. 4, 2008, now Pat. No. 7,542,598, which is a continuation of application No.

(Continued)

(51) Int. Cl.
*G07D 7/12* (2016.01)
*G06K 9/03* (2006.01)
(Continued)

(52) U.S. Cl.
CPC *G07D 7/12* (2013.01); *G06K 9/033* (2013.01); *G06K 9/726* (2013.01); *G06Q 10/10* (2013.01); *G06Q 20/042* (2013.01); *G06Q 20/0425* (2013.01); *G06Q 20/10* (2013.01); *G06Q 20/105* (2013.01); *G06Q 20/108* (2013.01);

(Continued)

(58) Field of Classification Search
CPC ................................. G06K 9/00; G06Q 40/00
USPC .................... 382/140, 311; 705/16, 18, 40
See application file for complete search history.

(56) References Cited

U.S. PATENT DOCUMENTS 2,669,998 A    2/1954   Buchholz
2,750,949 A    6/1956   Kulo et al.
(Continued)

FOREIGN PATENT DOCUMENTS

CA    2 624 638 A1    12/2007   ............. B65H 29/12
CA    2 684 159 A1    4/2010    ............. G07D 11/00
(Continued)

OTHER PUBLICATIONS

Applied Communications Inc.: BASE24 software, "Applied Communications Announces Joint Venture," Business Wire, 4 pages (Jan. 6, 1989).

(Continued)

*Primary Examiner* — Rokib Masud
(74) *Attorney, Agent, or Firm* — Nixon Peabody LLP

(57) ABSTRACT

A document processing system comprises an input receptacle for receiving documents. A transport mechanism receives the documents from the input receptacle and transports the documents past an image scanner and a discrimination unit. An output receptacle receives the documents from the transport mechanism after being transported past the image scanner and the discrimination unit. The image scanner obtains an image of the documents, obtains an image of a selected area of the documents, and obtains information contained in the selected area of the document. The discrimination unit determines the authenticity of the document. A system controller directs the flows of documents over the transport mechanism.

21 Claims, 15 Drawing Sheets

Related U.S. Application Data

11/726,827, filed on Mar. 23, 2007, now Pat. No. 7,391,897, which is a continuation of application No. 11/082,573, filed on Mar. 16, 2005, now Pat. No. 7,197,173, which is a continuation of application No. 10/042,675, filed on Jan. 9, 2002, now Pat. No. 6,996,263, which is a continuation of application No. 08/814,978, filed on Mar. 11, 1997, now Pat. No. 6,363,164, said application No. 12/025,661 is a continuation of application No. 10/393,867, filed on Mar. 20, 2003, now Pat. No. 7,349,566, which is a division of application No. 09/059,813, filed on Apr. 14, 1998, now Pat. No. 6,661,910.

(60) Provisional application No. 60/043,516, filed on Apr. 14, 1997, provisional application No. 60/053,606, filed on Jul. 22, 1997, provisional application No. 60/031,604, filed on Nov. 27, 1996.

(51) Int. Cl.

| | | |
|---|---|---|
| G06K 9/72 | (2006.01) | |
| G06Q 10/10 | (2012.01) | |
| G06Q 20/04 | (2012.01) | |
| G06Q 20/10 | (2012.01) | |
| G06Q 20/18 | (2012.01) | |
| G06Q 20/20 | (2012.01) | |
| G06Q 40/00 | (2012.01) | |
| G06Q 40/02 | (2012.01) | |
| G06T 1/00 | (2006.01) | |
| G07D 7/04 | (2016.01) | |
| G07D 7/06 | (2006.01) | |
| G07D 7/20 | (2016.01) | |
| G07D 11/00 | (2006.01) | |
| G07F 7/04 | (2006.01) | |
| G07F 19/00 | (2006.01) | |

(52) U.S. Cl.
CPC ............ *G06Q20/1085* (2013.01); *G06Q 20/18* (2013.01); *G06Q 20/20* (2013.01); *G06Q 40/00* (2013.01); *G06Q 40/02* (2013.01); *G06T 1/00* (2013.01); *G07D 7/04* (2013.01); *G07D 7/06* (2013.01); *G07D 7/122* (2013.01); *G07D 7/20* (2013.01); *G07D 11/0084* (2013.01); *G07F 7/04* (2013.01); *G07F 19/20* (2013.01); *G07F 19/202* (2013.01); *G07F 19/207* (2013.01); *G06K 2209/01* (2013.01)

(56) References Cited

U.S. PATENT DOCUMENTS

| | | | |
|---|---|---|---|
| 2,835,260 A | 5/1958 | Buchholz | |
| 2,936,684 A | 5/1960 | Simjian | |
| 3,104,314 A | 9/1963 | Simjian | |
| 3,148,932 A | 9/1964 | Simjian | |
| 3,150,912 A | 9/1964 | Simjian | |
| 3,246,295 A | 4/1966 | DeClaris et al. | |
| 3,280,974 A | 10/1966 | Riddle et al. | |
| 3,443,107 A | 5/1969 | Modglin | |
| 3,480,785 A | 11/1969 | Aufderheide | |
| 3,496,370 A | 2/1970 | Haville et al. | |
| 3,509,535 A | 4/1970 | Berube | |
| 3,612,835 A | 10/1971 | Andrews et al. | 235/61.11 D |
| 3,618,765 A | 11/1971 | Syosset et al. | 209/122 |
| 3,656,615 A | 4/1972 | Ptacek | 209/73 |
| 3,679,314 A | 7/1972 | Mustert | 356/71 |
| 3,715,031 A | 2/1973 | Okkonen | 209/75 |
| 3,725,667 A | 4/1973 | Schwartz | 250/219 |
| 3,764,899 A | 10/1973 | Peterson | 324/61 |
| 3,778,628 A | 12/1973 | Novak et al. | 250/556 |
| 3,782,543 A | 1/1974 | Martelli et al. | 209/75 |
| 3,798,603 A | 3/1974 | Wahlberg | 340/149 |
| 3,800,078 A | 3/1974 | Cochran et al. | 178/7.1 |
| 3,806,710 A | 4/1974 | Shigemori et al. | 235/92 |
| 3,815,021 A | 6/1974 | Kerr | 324/61 R |
| 3,842,281 A | 10/1974 | Goodrich | 250/461 |
| 3,870,629 A | 3/1975 | Carter et al. | 209/111.8 |
| 3,876,864 A | 4/1975 | Clark et al. | 235/61.7 B |
| 3,906,449 A | 9/1975 | Marchak | 340/149 |
| 3,930,582 A | 1/1976 | Gartner et al. | 209/88 |
| 3,949,363 A | 4/1976 | Holm | 340/146.3 D |
| 3,966,047 A | 6/1976 | Steiner | 209/75 |
| 3,976,198 A | 8/1976 | Carnes, Jr. et al. | 209/111.7 T |
| 4,023,011 A | 5/1977 | Nakajima et al. | 235/61.11 R |
| 4,027,142 A | 5/1977 | Paup et al. | 235/61.9 R |
| 4,040,010 A | 8/1977 | Crane | 340/146.3 SY |
| 4,041,456 A | 8/1977 | Ott et al. | 340/146.3 R |
| 4,096,991 A | 6/1978 | Iguchi | 235/419 |
| 4,109,238 A | 8/1978 | Creekmore | 340/149 A |
| 4,114,027 A | 9/1978 | Slater | 235/419 |
| 4,114,804 A | 9/1978 | Jones et al. | 235/476 |
| 4,147,430 A | 4/1979 | Gorgone et al. | 356/51 |
| 4,166,945 A | 9/1979 | Inoyama et al. | 235/379 |
| 4,179,685 A | 12/1979 | O'Maley | 340/146.3 H |
| 4,180,798 A | 12/1979 | Komori et al. | 340/146.3 H |
| 4,187,463 A | 2/1980 | Kivenson | 324/228 |
| 4,187,498 A | 2/1980 | Creekmore | 340/149 A |
| 4,197,986 A | 4/1980 | Nagata | 235/379 |
| 4,201,978 A * | 5/1980 | Nally | G07C 9/00063 235/379 |
| 4,205,780 A | 6/1980 | Burns et al. | 235/454 |
| 4,231,014 A | 10/1980 | Ponzio | 340/146.3 Y |
| 4,231,561 A * | 11/1980 | Kaneko | G03B 27/6264 271/186 |
| 4,237,378 A | 12/1980 | Jones | 250/223 R |
| 4,249,552 A | 2/1981 | Margolin et al. | 133/1 R |
| 4,250,806 A | 2/1981 | Boyson et al. | 101/2 |
| 4,255,651 A | 3/1981 | Phillips | 235/92 SB |
| 4,264,808 A | 4/1981 | Owens et al. | 235/379 |
| 4,275,874 A | 6/1981 | DiBlasio | 271/4 |
| 4,277,774 A | 7/1981 | Fujii et al. | 340/146.3 Q |
| 4,283,708 A | 8/1981 | Lee | 340/146.3 Z |
| 4,288,781 A | 9/1981 | Sellner et al. | 340/146.3 Q |
| 4,302,781 A | 11/1981 | Ikeda et al. | 358/288 |
| 4,310,885 A | 1/1982 | Azcua et al. | 364/405 |
| 4,311,914 A | 1/1982 | Huber | 250/556 |
| 4,313,598 A | 2/1982 | DiBlasio | 271/124 |
| 4,321,672 A | 3/1982 | Braun et al. | 705/42 |
| 4,326,636 A | 4/1982 | Kawakami | 209/534 |
| 4,334,619 A | 6/1982 | Horino et al. | 209/551 |
| 4,337,864 A | 7/1982 | McLean | 209/534 |
| 4,348,656 A | 9/1982 | Gorgone et al. | 340/146.3 R |
| 4,349,111 A | 9/1982 | Shah et al. | 209/534 |
| 4,352,988 A | 10/1982 | Ishida | 250/559 |
| 4,355,300 A | 10/1982 | Weber | 340/146.3 C |
| 4,355,369 A | 10/1982 | Garvin | 364/900 |
| 4,356,473 A | 10/1982 | Freudenthal | 340/146.3 H |
| 4,360,034 A | 11/1982 | Davila et al. | 133/3 D |
| 4,381,447 A | 4/1983 | Horvath et al. | 250/223 R |
| 4,383,540 A | 5/1983 | De Meyer et al. | 133/3 H |
| 4,386,432 A | 5/1983 | Nakamura et al. | 382/7 |
| 4,396,902 A | 8/1983 | Warthan et al. | 382/64 |
| 4,416,299 A | 11/1983 | Bergman | 133/1 R |
| 4,420,153 A | 12/1983 | Winkler et al. | 271/304 |
| 4,435,834 A | 3/1984 | Pauli et al. | 382/7 |
| 4,441,205 A | 4/1984 | Berkin et al. | 382/8 |
| 4,442,541 A | 4/1984 | Finkel et al. | 382/7 |
| 4,449,240 A | 5/1984 | Yoshida | 382/15 |
| 4,461,028 A | 7/1984 | Okubo | 382/15 |
| 4,462,509 A | 7/1984 | Adelberger | 221/259 |
| 4,464,786 A | 8/1984 | Nishito et al. | 382/7 |
| 4,464,787 A | 8/1984 | Fish et al. | 382/7 |
| RE31,692 E | 10/1984 | Tyburski et al. | 382/7 |
| 4,479,049 A | 10/1984 | Hirose | 235/379 |
| 4,480,177 A | 10/1984 | Allen | 235/379 |
| 4,482,058 A | 11/1984 | Steiner | 209/534 |
| 4,487,306 A | 12/1984 | Nao et al. | 194/4 C |
| 4,490,846 A | 12/1984 | Ishida et al. | 382/7 |
| 4,513,439 A | 4/1985 | Gorgone et al. | 382/7 |

(56) References Cited

U.S. PATENT DOCUMENTS

| | | | |
|---|---|---|---|
| 4,521,008 A | 6/1985 | Granzow et al. .................. 271/3 |
| 4,523,330 A | 6/1985 | Cain ................. 382/7 |
| 4,530,067 A | 7/1985 | Dorr ........................ 364/900 |
| 4,538,719 A | 9/1985 | Gray et al. ................ 194/100 A |
| 4,539,702 A | 9/1985 | Oka ........................ 382/7 |
| 4,542,287 A | 9/1985 | Watanabe .................... 235/379 |
| 4,542,829 A | 9/1985 | Emery et al. ................ 209/534 |
| 4,543,969 A | 10/1985 | Rasmussen ................. 133/3 A |
| 4,544,266 A | 10/1985 | Antes ........................ 356/71 |
| 4,547,896 A | 10/1985 | Ohtombe et al. ................ 382/7 |
| 4,553,222 A | 11/1985 | Kurland et al. ............... 364/900 |
| 4,553,846 A | 11/1985 | Hilton et al. ................ 356/429 |
| 4,556,140 A | 12/1985 | Okada ........................ 194/4 C |
| 4,558,224 A | 12/1985 | Gober ....................... 250/461.1 |
| 4,559,451 A | 12/1985 | Curl ........................ 250/560 |
| 4,563,771 A | 1/1986 | Gorgone et al. ................. 382/7 |
| 4,567,370 A | 1/1986 | Falls ........................ 250/461.1 |
| 4,569,421 A | 2/1986 | Sandstedt ...................... 186/39 |
| 4,582,172 A | 4/1986 | Takeuchi et al. ................ 186/38 |
| 4,584,529 A | 4/1986 | Aoyama ........................ 324/261 |
| 4,587,412 A | 5/1986 | Apisdorf ...................... 235/449 |
| 4,587,434 A | 5/1986 | Roes et al. ................... 250/556 |
| 4,590,606 A | 5/1986 | Rohrer ........................ 382/7 |
| 4,592,090 A | 5/1986 | Curl et al. ..................... 382/7 |
| 4,593,184 A | 6/1986 | Bryce ........................ 235/449 |
| 4,594,664 A | 6/1986 | Hashimoto .................... 364/405 |
| 4,602,149 A | 7/1986 | Tateisi et al. ................ 235/379 |
| 4,602,332 A | 7/1986 | Hirose et al. ................. 364/408 |
| 4,605,926 A | 8/1986 | Onishi et al. ................ 340/825.3 |
| 4,611,345 A | 9/1986 | Ohnishi et al. .................... 382/7 |
| 4,617,457 A | 10/1986 | Granzow et al. ................ 235/379 |
| 4,617,458 A | 10/1986 | Bryce ........................ 235/449 |
| 4,625,870 A | 12/1986 | Nao et al. ................... 209/534 |
| 4,628,194 A | 12/1986 | Dobbins et al. ................ 235/379 |
| 4,630,813 A | 12/1986 | Watanabe et al. ............. 271/227 |
| 4,632,252 A | 12/1986 | Haruki et al. ................. 209/546 |
| 4,645,936 A | 2/1987 | Gorgone ....................... 250/556 |
| 4,653,647 A | 3/1987 | Hashimoto .................... 209/534 |
| 4,658,289 A | 4/1987 | Nagano et al. .................. 358/75 |
| 4,676,343 A | 6/1987 | Humble et al. ................. 186/61 |
| 4,677,682 A | 6/1987 | Miyagawa et al. ................ 382/7 |
| 4,678,072 A | 7/1987 | Kobayashi et al. ........... 194/206 |
| 4,680,803 A | 7/1987 | Dilella .......................... 382/9 |
| 4,685,141 A | 8/1987 | Hoque et al. .................... 382/7 |
| 4,686,357 A | 8/1987 | Douno et al. ................. 235/379 |
| 4,694,963 A | 9/1987 | Takesako ...................... 209/534 |
| 4,697,071 A | 9/1987 | Hiraoka et al. ................ 235/379 |
| 4,700,368 A | 10/1987 | Munn et al. ..................... 377/8 |
| 4,716,456 A | 12/1987 | Hosaka ........................ 358/75 |
| 4,733,308 A | 3/1988 | Nakamura et al. ............. 358/288 |
| 4,735,289 A | 4/1988 | Kenyon ........................ 186/37 |
| 4,739,156 A | 4/1988 | Watanabe .................... 235/379 |
| 4,743,743 A | 5/1988 | Fukatsu ........................ 235/379 |
| 4,743,974 A | 5/1988 | Lockwood .................... 358/285 |
| 4,748,679 A | 5/1988 | Gold et al. ..................... 382/61 |
| 4,749,087 A | 6/1988 | Buttifant ...................... 209/534 |
| 4,753,625 A | 6/1988 | Okada ........................ 453/32 |
| 4,764,725 A | 8/1988 | Bryce ........................ 324/234 |
| 4,764,976 A | 8/1988 | Kallin et al. .................... 382/65 |
| 4,768,100 A | 8/1988 | Kunishima et al. ............. 358/285 |
| 4,774,663 A | 9/1988 | Musmanno et al. ............. 364/408 |
| 4,782,328 A | 11/1988 | Denlinger .................. 340/365 P |
| 4,784,274 A | 11/1988 | Mori et al. ................... 209/534 |
| 4,803,347 A | 2/1989 | Sugahara et al. ............. 235/379 |
| 4,806,709 A | 2/1989 | Evans ........................ 179/19 |
| 4,811,004 A | 3/1989 | Person et al. ................ 340/712 |
| 4,817,176 A | 3/1989 | Marshall et al. ................ 382/43 |
| 4,821,332 A | 4/1989 | Durham ........................ 382/7 |
| 4,823,393 A | 4/1989 | Kawakami ...................... 382/7 |
| 4,825,246 A | 4/1989 | Fukuchi et al. ................. 355/4 |
| 4,827,531 A | 5/1989 | Milford ........................ 382/29 |
| 4,837,842 A | 6/1989 | Holt ........................ 382/26 |
| 4,841,358 A | 6/1989 | Kammoto et al. .............. 358/75 |
| 4,843,219 A | 6/1989 | Franchi ........................ 235/379 |
| 4,851,616 A | 7/1989 | Wales et al. ................... 178/18 |
| 4,877,230 A | 10/1989 | Winkler et al. ................... 271/3 |
| 4,880,096 A | 11/1989 | Kobayashi et al. ............ 194/206 |
| 4,881,268 A | 11/1989 | Uchida et al. ...................... 382/7 |
| 4,883,181 A | 11/1989 | Yoshikawa .................... 209/534 |
| 4,888,812 A | 12/1989 | Dinan et al. ...................... 382/7 |
| 4,903,953 A | 2/1990 | Winkler et al. ................... 271/4 |
| 4,905,839 A | 3/1990 | Yuge et al. ................... 209/534 |
| 4,905,840 A | 3/1990 | Yuge et al. ................... 209/534 |
| 4,908,516 A | 3/1990 | West .......................... 250/556 |
| 4,922,109 A | 5/1990 | Bercovitz et al. ............. 250/556 |
| 4,928,094 A | 5/1990 | Smith ......................... 340/712 |
| 4,931,782 A | 6/1990 | Jackson ........................ 340/706 |
| 4,947,441 A | 8/1990 | Hara et al. ........................ 382/7 |
| 4,948,174 A | 8/1990 | Thomson et al. ................ 283/58 |
| 4,954,697 A | 9/1990 | Kokubun et al. .............. 235/381 |
| 4,958,235 A | 9/1990 | Sims et al. .................... 358/402 |
| 4,960,981 A | 10/1990 | Benton et al. ................. 235/379 |
| 4,970,655 A | 11/1990 | Winn et al. ................... 364/479 |
| 4,973,851 A | 11/1990 | Lee ............................ 250/556 |
| 4,980,543 A | 12/1990 | Hara et al. ................... 235/379 |
| 4,984,280 A | 1/1991 | Abe ........................... 382/7 |
| 4,988,849 A | 1/1991 | Sasaki et al. .................. 235/379 |
| 4,992,860 A | 2/1991 | Hamaguchi et al. ............. 358/75 |
| 4,996,604 A | 2/1991 | Ogawa et al. .................. 358/474 |
| 5,001,766 A | 3/1991 | Baird ........................... 382/290 |
| 5,010,238 A | 4/1991 | Kadono et al. ................ 235/379 |
| 5,023,782 A | 6/1991 | Lutz et al. ..................... 364/405 |
| 5,025,483 A | 6/1991 | Dinan et al. ..................... 382/58 |
| 5,027,415 A | 6/1991 | Hara et al. ....................... 382/7 |
| 5,039,847 A | 8/1991 | Morii et al. .................... 235/379 |
| 5,040,226 A | 8/1991 | Elischer et al. .................... 382/7 |
| 5,047,871 A | 9/1991 | Meyer et al. .................. 358/486 |
| 5,053,607 A * | 10/1991 | Carlson ................. G06K 17/00 235/379 |
| 5,054,621 A | 10/1991 | Murphy et al. ............... 209/534 |
| 5,055,834 A | 10/1991 | Chiba ....................... 340/825.34 |
| 5,063,599 A | 11/1991 | Concannon et al. .............. 382/7 |
| 5,064,999 A | 11/1991 | Okamoto et al. ............. 235/379 |
| 5,068,519 A | 11/1991 | Bryce ........................ 235/449 |
| 5,076,441 A | 12/1991 | Gerlier ........................ 209/534 |
| 5,091,961 A | 2/1992 | Baus, Jr. ........................ 382/7 |
| 5,097,517 A | 3/1992 | Holt ........................... 382/7 |
| 5,105,364 A | 4/1992 | Kawamura et al. ........... 364/478 |
| 5,105,601 A | 4/1992 | Horiguchi et al. .............. 53/465 |
| 5,114,381 A | 5/1992 | Ueda et al. ..................... 453/57 |
| 5,119,433 A | 6/1992 | Will ............................. 382/7 |
| 5,120,944 A | 6/1992 | Kern et al. .................... 235/379 |
| 5,122,754 A | 6/1992 | Gotaas ........................ 324/676 |
| 5,134,663 A | 7/1992 | Kozlowski ..................... 382/7 |
| 5,135,115 A | 8/1992 | Miller et al. .................. 209/564 |
| 5,144,115 A | 9/1992 | Yoshida ...................... 235/379 |
| 5,146,067 A | 9/1992 | Sloan et al. .................. 235/381 |
| 5,146,512 A | 9/1992 | Weideman et al. .............. 382/30 |
| 5,151,607 A | 9/1992 | Crane et al. .................. 250/556 |
| 5,154,272 A | 10/1992 | Nishiumi et al. .............. 194/318 |
| 5,159,548 A | 10/1992 | Caslavka ..................... 364/408 |
| 5,163,672 A | 11/1992 | Mennie ....................... 271/187 |
| 5,163,868 A | 11/1992 | Adams et al. ................ 453/11 |
| 5,167,313 A | 12/1992 | Dobbins et al. ............... 194/317 |
| 5,179,517 A | 1/1993 | Sarbin et al. .................. 364/410 |
| 5,183,142 A | 2/1993 | Latchinian et al. ........... 194/206 |
| 5,184,115 A | 2/1993 | Black et al. .................. 340/708 |
| 5,184,709 A | 2/1993 | Nishiumi et al. .............. 194/318 |
| 5,186,334 A | 2/1993 | Fukudome et al. ............ 209/534 |
| 5,187,750 A | 2/1993 | Behera ........................... 382/7 |
| 5,191,525 A | 3/1993 | LeBrun et al. ................ 364/419 |
| 5,193,121 A | 3/1993 | Elischer et al. .................... 382/7 |
| 5,198,976 A | 3/1993 | Form et al. .................... 364/410 |
| 5,199,543 A | 4/1993 | Kamagami et al. ............ 194/207 |
| 5,201,395 A | 4/1993 | Takizawa et al. ............. 194/206 |
| 5,204,811 A | 4/1993 | Bednar et al. ................... 705/45 |
| 5,206,915 A | 4/1993 | Kern et al. ...................... 382/7 |
| 5,207,788 A | 5/1993 | Geib ............................. 271/122 |
| 5,220,501 A * | 6/1993 | Lawlor ................. G06Q 20/04 379/93.18 |
| 5,231,381 A | 7/1993 | Duwaer ...................... 340/712 |
| 5,237,158 A | 8/1993 | Kern et al. ................... 235/379 |
| 5,237,159 A | 8/1993 | Stephens et al. ............. 235/379 |
| 5,239,593 A | 8/1993 | Wittner et al. ................. 382/14 |

(56) References Cited

U.S. PATENT DOCUMENTS

| | | | |
|---|---|---|---|
| 5,251,273 A * | 10/1993 | Betts et al. | 382/311 |
| 5,251,738 A | 10/1993 | Dabrowski | 194/206 |
| 5,252,811 A | 10/1993 | Henochowicz et al. | 235/379 |
| 5,258,855 A | 11/1993 | Lech et al. | 358/462 |
| 5,261,518 A | 11/1993 | Bryce | 194/206 |
| 5,265,008 A | 11/1993 | Benton et al. | 364/408 |
| 5,272,641 A | 12/1993 | Ford et al. | 364/468 |
| 5,274,641 A | 12/1993 | Shobatake et al. | 370/94.1 |
| 5,279,403 A | 1/1994 | Harbaugh et al. | 194/207 |
| 5,286,954 A | 2/1994 | Sato et al. | 235/379 |
| 5,295,196 A | 3/1994 | Raterman et al. | 382/135 |
| 5,297,030 A | 3/1994 | Vassigh et al. | 364/405 |
| 5,304,813 A | 4/1994 | De Man | 250/556 |
| 5,308,992 A | 5/1994 | Crane et al. | 250/556 |
| 5,309,515 A | 5/1994 | Troung et al. | 382/7 |
| 5,316,279 A | 5/1994 | Corona et al. | 270/1.1 |
| 5,317,140 A | 5/1994 | Dunthorn | 250/221 |
| 5,321,238 A | 6/1994 | Kamata et al. | 235/379 |
| 5,335,292 A | 8/1994 | Lovelady et al. | 382/17 |
| 5,335,484 A | 8/1994 | Hain | 53/582 |
| 5,341,408 A | 8/1994 | Melcher et al. | 377/8 |
| 5,342,165 A | 8/1994 | Graef et al. | 414/788.9 |
| 5,363,949 A | 11/1994 | Matsubayashi | 194/206 |
| 5,367,577 A | 11/1994 | Gotaas | 382/7 |
| 5,368,147 A | 11/1994 | Menke et al. | 194/206 |
| 5,371,345 A | 12/1994 | LeStrange et al. | 235/380 |
| 5,371,798 A | 12/1994 | McWhortor | 380/51 |
| 5,373,550 A * | 12/1994 | Campbell | G06Q 20/02 235/379 |
| 5,379,344 A | 1/1995 | Larsson et al. | 380/23 |
| 5,381,019 A | 1/1995 | Sato | 250/556 |
| 5,383,754 A | 1/1995 | Sumida et al. | 412/11 |
| 5,394,969 A | 3/1995 | Harbaugh | 194/206 |
| 5,399,874 A | 3/1995 | Gonsalves et al. | 250/556 |
| 5,402,895 A | 4/1995 | Mikkelsen et al. | 209/534 |
| 5,412,190 A | 5/1995 | Josephson et al. | 235/379 |
| 5,416,307 A | 5/1995 | Danek et al. | 235/449 |
| 5,417,316 A | 5/1995 | Harbaugh | 194/206 |
| 5,418,458 A | 5/1995 | Jeffers | 324/235 |
| 5,419,424 A | 5/1995 | Harbaugh | 194/206 |
| 5,421,443 A | 6/1995 | Hatamachi et al. | 194/206 |
| 5,422,467 A | 6/1995 | Graef et al. | 235/379 |
| 5,430,664 A | 7/1995 | Cargill et al. | 364/550 |
| 5,434,427 A | 7/1995 | Crane et al. | 250/556 |
| 5,437,357 A | 8/1995 | Ota et al. | 194/206 |
| 5,438,184 A | 8/1995 | Roberts et al. | 235/380 |
| 5,442,162 A | 8/1995 | Armel | 235/381 |
| 5,444,793 A | 8/1995 | Kelland | 382/138 |
| 5,444,794 A | 8/1995 | Uhland, Sr. | 382/137 |
| 5,453,601 A | 9/1995 | Rosen | 235/379 |
| 5,459,304 A | 10/1995 | Eisenmann | 235/380 |
| 5,465,301 A | 11/1995 | Jotcham et al. | 380/54 |
| 5,465,821 A | 11/1995 | Akioka | 194/207 |
| 5,467,405 A | 11/1995 | Raterman et al. | 382/135 |
| 5,467,406 A | 11/1995 | Graves et al. | 382/135 |
| 5,468,941 A | 11/1995 | Sasaki | 235/379 |
| 5,468,971 A | 11/1995 | Ebstein et al. | 250/556 |
| 5,469,241 A | 11/1995 | Takahashi et al. | 355/64 |
| 5,471,039 A | 11/1995 | Irwin et al. | 235/441 |
| 5,476,169 A | 12/1995 | Takarada et al. | 194/207 |
| 5,481,377 A | 1/1996 | Udagawa et al. | 358/501 |
| 5,488,671 A | 1/1996 | Kern | 382/138 |
| 5,491,325 A | 2/1996 | Huang et al. | 235/379 |
| 5,504,822 A | 4/1996 | Holt | 382/218 |
| 5,506,691 A | 4/1996 | Bednar et al. | 358/402 |
| 5,509,692 A | 4/1996 | Oz | 283/70 |
| D369,984 S | 5/1996 | Larsen | D10/97 |
| 5,523,575 A | 6/1996 | Machida et al. | 250/208.1 |
| 5,530,772 A | 6/1996 | Storey | 382/135 |
| 5,530,773 A | 6/1996 | Thompson | 382/138 |
| 5,532,464 A | 7/1996 | Josephson et al. | 235/379 |
| 5,537,486 A | 7/1996 | Stratigos et al. | 382/137 |
| 5,539,825 A | 7/1996 | Akiyama et al. | 705/68 |
| 5,544,043 A | 8/1996 | Miki et al. | 364/406 |
| 5,544,086 A | 8/1996 | Davis et al. | 364/408 |
| 5,545,885 A | 8/1996 | Jagielinski | 235/449 |
| 5,564,546 A | 10/1996 | Molbak et al. | 194/216 |
| 5,586,036 A | 12/1996 | Pintsov | 364/464.02 |
| 5,590,196 A | 12/1996 | Moreau | 380/18 |
| 5,592,377 A | 1/1997 | Lipkin | 395/242 |
| 5,592,561 A | 1/1997 | Moore | 382/103 |
| 5,594,225 A | 1/1997 | Botvin | 235/379 |
| 5,600,704 A | 2/1997 | Ahlberg et al. | 379/58 |
| 5,600,732 A | 2/1997 | Ott et al. | 382/112 |
| 5,602,933 A | 2/1997 | Blackwell et al. | 382/116 |
| 5,602,936 A | 2/1997 | Green et al. | 382/140 |
| 5,607,040 A | 3/1997 | Mathurin, Sr. | 194/207 |
| 5,615,280 A | 3/1997 | Izawa et al. | 382/135 |
| 5,616,902 A | 4/1997 | Cooley | 235/380 |
| 5,620,079 A | 4/1997 | Molbak | 194/217 |
| 5,633,949 A | 5/1997 | Graves et al. | 382/135 |
| 5,640,463 A | 6/1997 | Csulits | 382/135 |
| 5,652,802 A | 7/1997 | Graves et al. | 382/135 |
| 5,657,846 A | 8/1997 | Schwartz | 194/206 |
| 5,671,282 A | 9/1997 | Wolff et al. | 380/25 |
| 5,678,046 A | 10/1997 | Cahill et al. | 395/616 |
| 5,680,472 A | 10/1997 | Conant | 382/135 |
| 5,687,963 A | 11/1997 | Mennie | 271/119 |
| 5,692,067 A | 11/1997 | Raterman et al. | 382/135 |
| 5,703,344 A | 12/1997 | Bezy et al. | 235/379 |
| 5,704,491 A | 1/1998 | Graves | 209/534 |
| 5,708,810 A | 1/1998 | Kern et al. | 395/712 |
| 5,719,948 A | 2/1998 | Liang | 382/112 |
| 5,724,438 A | 3/1998 | Graves | 382/135 |
| 5,727,667 A | 3/1998 | Nye | 194/207 |
| 5,729,623 A | 3/1998 | Omatu et al. | 382/155 |
| 5,751,840 A | 5/1998 | Raterman et al. | 382/135 |
| 5,751,842 A | 5/1998 | Riach et al. | 382/137 |
| 5,754,673 A | 5/1998 | Brooks et al. | 382/112 |
| 5,754,674 A | 5/1998 | Ott et al. | 382/112 |
| 5,755,437 A | 5/1998 | Ek | 271/227 |
| 5,761,089 A | 6/1998 | McInerny | 364/550 |
| 5,768,416 A | 6/1998 | Lech et al. | 382/180 |
| 5,781,654 A | 7/1998 | Carney | 382/137 |
| 5,790,693 A | 8/1998 | Graves et al. | 382/135 |
| 5,790,697 A | 8/1998 | Munro et al. | 382/135 |
| 5,799,767 A | 9/1998 | Molbak | 194/217 |
| 5,806,650 A | 9/1998 | Mennie et al. | 194/206 |
| 5,813,510 A | 9/1998 | Rademacher | 194/206 |
| 5,815,592 A | 9/1998 | Mennie et al. | 382/135 |
| 5,822,448 A | 10/1998 | Graves et al. | 382/135 |
| 5,830,054 A | 11/1998 | Petri | 453/5 |
| 5,832,104 A | 11/1998 | Graves et al. | 382/135 |
| 5,832,460 A | 11/1998 | Bednar et al. | 705/27.2 |
| 5,832,463 A | 11/1998 | Funk | 705/35 |
| 5,842,188 A | 11/1998 | Ramsey et al. | 705/416 |
| 5,852,811 A | 12/1998 | Atkins | 705/36 |
| 5,867,589 A | 2/1999 | Graves et al. | 382/135 |
| 5,870,487 A | 2/1999 | Graves et al. | 382/135 |
| 5,870,725 A | 2/1999 | Bellinger et al. | 705/45 |
| 5,874,717 A | 2/1999 | Kern et al. | 235/379 |
| 5,875,259 A | 2/1999 | Mennie et al. | 382/135 |
| 5,892,211 A | 4/1999 | Davis et al. | 235/380 |
| 5,894,937 A | 4/1999 | Schmidt | 209/534 |
| 5,905,810 A | 5/1999 | Jones et al. | 382/135 |
| 5,909,502 A | 6/1999 | Mazur | 382/135 |
| 5,909,503 A | 6/1999 | Graves et al. | 382/135 |
| 5,912,982 A | 6/1999 | Munro et al. | 382/135 |
| 5,917,930 A | 6/1999 | Kayani et al. | 382/135 |
| 5,918,748 A | 7/1999 | Clark et al. | 209/534 |
| 5,923,413 A | 7/1999 | Laskowski | 356/71 |
| 5,926,392 A | 7/1999 | York et al. | 364/478.11 |
| 5,926,550 A | 7/1999 | Davis | 380/25 |
| 5,930,778 A | 7/1999 | Geer | 705/45 |
| 5,936,219 A | 8/1999 | Yoshida et al. | 235/379 |
| 5,938,044 A | 8/1999 | Weggesser | 209/534 |
| 5,940,623 A | 8/1999 | Watts et al. | 395/712 |
| 5,940,844 A | 8/1999 | Cahill et al. | 707/526 |
| 5,942,255 A | 8/1999 | Klesges | 424/682 |
| 5,943,655 A | 8/1999 | Jacobson | 705/30 |
| 5,947,255 A | 9/1999 | Shimada et al. | 194/207 |
| 5,960,103 A | 9/1999 | Graves et al. | 382/135 |
| 5,966,456 A | 10/1999 | Jones et al. | 382/135 |
| 5,982,918 A | 11/1999 | Mennie et al. | 382/135 |

(56) References Cited

U.S. PATENT DOCUMENTS

| | | | |
|---|---|---|---|
| 5,992,601 A | 11/1999 | Mennie et al. | 194/207 |
| 6,012,048 A | 1/2000 | Gustin et al. | 705/39 |
| 6,012,565 A | 1/2000 | Mazur | 194/207 |
| 6,021,883 A | 2/2000 | Casanova et al. | 194/217 |
| 6,023,684 A | 2/2000 | Pearson | 705/35 |
| 6,023,688 A | 2/2000 | Ramachandran et al. | 705/44 |
| 6,026,175 A | 2/2000 | Munro et al. | 382/135 |
| 6,028,951 A | 2/2000 | Raterman et al. | 382/135 |
| 6,036,344 A | 3/2000 | Goldenberg | 364/408 |
| 6,038,553 A | 3/2000 | Hyde, Jr. | 705/45 |
| 6,045,039 A | 4/2000 | Stinson et al. | 235/379 |
| 6,055,327 A | 4/2000 | Aragon | 382/138 |
| 6,065,672 A | 5/2000 | Haycock | 235/379 |
| 6,068,194 A | 5/2000 | Mazur | 235/492 |
| 6,072,896 A | 6/2000 | Graves et al. | 382/135 |
| 6,073,744 A | 6/2000 | Raterman et al. | 194/207 |
| 6,074,334 A | 6/2000 | Mennie et al. | 493/438 |
| 6,076,826 A | 6/2000 | Gerlier et al. | 271/274 |
| 6,078,683 A | 6/2000 | Denison et al. | 382/135 |
| D427,623 S | 7/2000 | Kuwada | D18/3 |
| 6,097,834 A | 8/2000 | Krouse et al. | 382/137 |
| 6,101,266 A | 8/2000 | Laskowski et al. | 382/135 |
| 6,105,007 A | 8/2000 | Norris | 705/38 |
| 6,109,522 A | 8/2000 | Force et al. | 235/379 |
| 6,115,509 A * | 9/2000 | Yeskel | G06F 17/30017 382/309 |
| 6,119,946 A | 9/2000 | Teicher | 235/492 |
| 6,128,402 A | 10/2000 | Jones et al. | 382/135 |
| 6,131,718 A | 10/2000 | Witschorik | 194/206 |
| 6,141,438 A | 10/2000 | Blanchester | 382/140 |
| 6,144,459 A | 11/2000 | Satou | 358/1.15 |
| 6,145,738 A | 11/2000 | Stinson et al. | 235/379 |
| 6,181,837 B1 | 1/2001 | Cahill et al. | 382/305 |
| 6,220,419 B1 | 4/2001 | Mennie | 194/207 |
| 6,237,739 B1 | 5/2001 | Mazur et al. | 194/207 |
| 6,241,069 B1 | 6/2001 | Mazur et al. | 194/207 |
| 6,256,407 B1 | 7/2001 | Mennie et al. | 382/135 |
| 6,264,101 B1 | 7/2001 | Ryan et al. | 235/379 |
| 6,273,413 B1 | 8/2001 | Graef | 271/3.14 |
| 6,278,795 B1 | 8/2001 | Anderson et al. | 382/135 |
| 6,282,523 B1 | 8/2001 | Tedesco et al. | 705/45 |
| 6,283,366 B1 | 9/2001 | Hills et al. | 235/379 |
| 6,311,819 B1 | 11/2001 | Stromme et al. | 194/207 |
| 6,318,536 B1 | 11/2001 | Korman et al. | 194/217 |
| 6,318,537 B1 | 11/2001 | Jones et al. | 194/346 |
| 6,321,894 B1 | 11/2001 | Johnsson | 194/208 |
| 6,351,551 B1 | 2/2002 | Munro et al. | 382/135 |
| 6,351,552 B1 | 2/2002 | Weaver et al. | 382/135 |
| 6,354,491 B2 | 3/2002 | Nichols et al. | 235/379 |
| 6,363,164 B1 | 3/2002 | Jones et al. | 382/135 |
| 6,363,362 B1 | 3/2002 | Burfield | 705/40 |
| 6,371,303 B1 | 4/2002 | Klein et al. | 209/534 |
| 6,373,965 B1 | 4/2002 | Liang | 382/112 |
| 6,378,683 B2 | 4/2002 | Mennie | 194/207 |
| 6,381,354 B1 | 4/2002 | Mennie et al. | 382/135 |
| 6,398,000 B1 | 6/2002 | Jenrick et al. | 194/200 |
| 6,415,983 B1 | 7/2002 | Ulvr et al. | 235/487 |
| 6,430,320 B1 | 8/2002 | Jia et al. | 382/289 |
| 6,439,395 B1 | 8/2002 | Voellmer et al. | 209/534 |
| 6,459,806 B1 | 10/2002 | Raterman et al. | 382/135 |
| 6,460,705 B1 | 10/2002 | Hallowell | 209/534 |
| 6,473,519 B1 | 10/2002 | Pidhirny et al. | 382/140 |
| 6,493,461 B1 | 12/2002 | Mennie et al. | 382/135 |
| 6,510,238 B2 | 1/2003 | Haycock | 382/135 |
| 6,516,078 B1 | 2/2003 | Yang et al. | 382/100 |
| 6,539,104 B1 | 3/2003 | Raterman et al. | 382/135 |
| 6,540,090 B1 | 4/2003 | Sakai et al. | 209/534 |
| 6,546,351 B1 | 4/2003 | Haycock et al. | 702/127 |
| 6,550,671 B1 | 4/2003 | Brown et al. | 235/379 |
| 6,560,355 B2 | 5/2003 | Graves et al. | 382/135 |
| 6,573,983 B1 | 6/2003 | Laskowski | 356/71 |
| 6,574,377 B1 | 6/2003 | Cahill et al. | 382/305 |
| 6,588,569 B1 | 7/2003 | Jenrick et al. | 194/206 |
| 6,601,687 B1 | 8/2003 | Jenrick et al. | 194/206 |
| 6,603,580 B1 | 8/2003 | Taillie | 358/474 |
| 6,603,872 B2 | 8/2003 | Jones et al. | 382/135 |
| 6,611,351 B1 | 8/2003 | Simonoff | 358/1.18 |
| 6,621,919 B2 | 9/2003 | Mennie et al. | 382/135 |
| 6,628,816 B2 | 9/2003 | Mennie et al. | 382/135 |
| 6,636,624 B2 | 10/2003 | Raterman et al. | 382/135 |
| 6,637,576 B1 | 10/2003 | Jones et al. | 194/216 |
| 6,647,136 B2 | 11/2003 | Jones et al. | 382/137 |
| 6,650,767 B2 | 11/2003 | Jones et al. | 382/135 |
| 6,654,149 B1 | 11/2003 | Sheng | 358/474 |
| 6,654,486 B2 | 11/2003 | Jones et al. | 382/135 |
| 6,661,910 B2 | 12/2003 | Jones et al. | 382/135 |
| 6,665,431 B2 | 12/2003 | Jones et al. | 382/135 |
| 6,678,401 B2 | 1/2004 | Jones et al. | 382/135 |
| 6,678,402 B2 | 1/2004 | Jones et al. | 382/135 |
| 6,679,775 B1 | 1/2004 | Luciano et al. | 463/25 |
| 6,697,511 B1 | 2/2004 | Haycock | 382/135 |
| 6,705,470 B2 | 3/2004 | Klein et al. | 209/534 |
| 6,721,442 B1 | 4/2004 | Mennie et al. | 382/135 |
| 6,722,486 B2 | 4/2004 | Shibata et al. | 194/206 |
| 6,724,926 B2 | 4/2004 | Jones et al. | 382/135 |
| 6,724,927 B2 | 4/2004 | Jones et al. | 382/135 |
| 6,731,785 B1 | 5/2004 | Mennie et al. | 382/135 |
| 6,731,786 B2 | 5/2004 | Jones et al. | 382/135 |
| 6,748,101 B1 | 6/2004 | Jones et al. | 382/135 |
| 6,778,693 B2 | 8/2004 | Jones et al. | 382/135 |
| 6,783,065 B2 | 8/2004 | Spitz et al. | 235/380 |
| 6,785,405 B2 | 8/2004 | Tuttle et al. | 382/112 |
| 6,786,398 B1 | 9/2004 | Stinson et al. | 235/379 |
| 6,798,899 B2 | 9/2004 | Mennie et al. | 382/135 |
| 6,810,137 B2 | 10/2004 | Jones et al. | 382/135 |
| 6,843,418 B2 | 1/2005 | Jones et al. | 235/462.01 |
| 6,848,561 B2 | 2/2005 | Bao | 194/207 |
| 6,860,375 B2 | 3/2005 | Hallowell et al. | 194/328 |
| 6,863,214 B2 | 3/2005 | Garner et al. | 235/379 |
| 6,866,134 B2 | 3/2005 | Stromme et al. | 194/207 |
| 6,868,954 B2 | 3/2005 | Stromme et al. | 194/207 |
| 6,880,692 B1 | 4/2005 | Mazur et al. | 194/207 |
| 6,883,706 B2 | 4/2005 | Mastie et al. | 235/379 |
| 6,883,707 B2 | 4/2005 | Nagasaka et al. | 235/379 |
| 6,913,130 B1 | 7/2005 | Mazur et al. | 194/207 |
| 6,913,260 B2 | 7/2005 | Maier et al. | 271/265.04 |
| 6,915,893 B2 | 7/2005 | Mennie | 194/207 |
| 6,929,109 B1 | 8/2005 | Klein et al. | 194/206 |
| 6,955,253 B1 | 10/2005 | Mazur et al. | 194/207 |
| 6,957,733 B2 | 10/2005 | Mazur et al. | 194/215 |
| 6,959,800 B1 | 11/2005 | Mazur et al. | 194/207 |
| 6,962,247 B2 | 11/2005 | Maier et al. | 194/207 |
| 6,980,684 B1 | 12/2005 | Munro et al. | 382/135 |
| 6,994,200 B2 | 2/2006 | Jenrick et al. | 194/206 |
| 6,996,263 B2 | 2/2006 | Jones et al. | 382/135 |
| 7,000,828 B2 | 2/2006 | Jones | 235/379 |
| 7,006,664 B2 | 2/2006 | Paraskevakos | 382/100 |
| 7,016,767 B2 | 3/2006 | Jones et al. | 700/224 |
| 7,028,888 B2 | 4/2006 | Laskowski | 235/379 |
| 7,034,324 B2 | 4/2006 | Voser | 250/556 |
| 7,036,651 B2 | 5/2006 | Tam et al. | 194/217 |
| 7,082,216 B2 | 7/2006 | Jones et al. | 382/137 |
| 7,092,560 B2 | 8/2006 | Jones et al. | 382/135 |
| 7,103,206 B2 | 9/2006 | Graves et al. | 382/135 |
| 7,103,438 B2 | 9/2006 | Hallowell et al. | 700/116 |
| 7,113,615 B2 | 9/2006 | Rhoads et al. | 382/100 |
| 7,113,925 B2 | 9/2006 | Waserstein et al. | 705/50 |
| 7,120,608 B1 | 10/2006 | Gallagher et al. | 705/68 |
| 7,124,113 B1 | 10/2006 | Fairclough et al. | 705/50 |
| 7,146,245 B2 | 12/2006 | Jones et al. | 700/224 |
| 7,149,336 B2 | 12/2006 | Jones et al. | 382/135 |
| 7,158,662 B2 | 1/2007 | Chiles | 382/135 |
| 7,171,032 B2 | 1/2007 | Jones et al. | 382/135 |
| 7,187,795 B2 | 3/2007 | Jones et al. | 382/135 |
| 7,191,657 B2 | 3/2007 | Maier et al. | 73/587 |
| 7,197,173 B2 | 3/2007 | Jones et al. | 382/135 |
| 7,200,255 B2 | 4/2007 | Jones et al. | 382/135 |
| 7,201,320 B2 | 4/2007 | Csulits et al. | 235/462.01 |
| 7,201,340 B2 | 4/2007 | Dietrich et al. | 241/101.2 |
| 7,216,106 B1 | 5/2007 | Buchanan et al. | 705/45 |
| 7,232,024 B2 | 6/2007 | Mazur et al. | 194/207 |
| 7,243,773 B2 | 7/2007 | Bochonok et al. | 194/350 |
| 7,248,730 B2 | 7/2007 | Matsui et al. | 382/135 |
| 7,248,731 B2 | 7/2007 | Raterman et al. | 382/135 |

(56) References Cited

U.S. PATENT DOCUMENTS

| | | | |
|---|---|---|---|
| 7,256,874 B2 | 8/2007 | Csulits et al. | 356/71 |
| 7,269,279 B2 | 9/2007 | Chiles | 382/135 |
| 7,312,902 B2 | 12/2007 | Mastie et al. | 358/3.28 |
| 7,349,566 B2 | 3/2008 | Jones et al. | 382/139 |
| 7,360,682 B2 | 4/2008 | Shane et al. | 235/379 |
| 7,362,891 B2 | 4/2008 | Jones et al. | 382/135 |
| 7,366,338 B2 | 4/2008 | Jones et al. | 382/135 |
| 7,391,897 B2 | 6/2008 | Jones et al. | 382/135 |
| 7,419,088 B2 | 9/2008 | Zhao et al. | 235/379 |
| 7,441,712 B2 | 10/2008 | Silverbrook et al. | 235/494 |
| 7,454,049 B2 | 11/2008 | Paraskevakos | 382/135 |
| 7,494,052 B1 | 2/2009 | Carpenter et al. | 235/379 |
| 7,505,831 B2 | 3/2009 | Jones et al. | 700/224 |
| 7,506,168 B2 | 3/2009 | Silverbrook et al. | 713/176 |
| 7,513,413 B2 | 4/2009 | Graef et al. | 235/379 |
| 7,536,046 B2 | 5/2009 | Raterman et al. | 382/135 |
| 7,542,598 B2 | 6/2009 | Jones et al. | 382/135 |
| 7,551,764 B2 | 6/2009 | Chiles et al. | 382/135 |
| 7,567,698 B2 | 7/2009 | Paraskevakos | 382/135 |
| 7,574,377 B2 | 8/2009 | Carapelli | 705/26 |
| 7,590,274 B2 | 9/2009 | Raterman et al. | 382/135 |
| 7,591,428 B2 | 9/2009 | Freeman et al. | 235/449 |
| 7,599,543 B2 | 10/2009 | Jones et al. | 382/137 |
| 7,600,626 B2 | 10/2009 | Hallowell et al. | 194/206 |
| 7,602,956 B2 | 10/2009 | Jones et al. | 382/135 |
| 7,619,721 B2 | 11/2009 | Jones et al. | 356/71 |
| 7,620,231 B2 | 11/2009 | Jones et al. | 382/135 |
| 7,628,326 B2 | 12/2009 | Freeman et al. | 235/450 |
| 7,635,082 B2 | 12/2009 | Jones | 235/379 |
| 7,647,275 B2 | 1/2010 | Jones | 705/40 |
| 7,650,980 B2 | 1/2010 | Jenrick et al. | 194/206 |
| 7,672,499 B2 | 3/2010 | Raterman et al. | 382/135 |
| 7,686,151 B2 | 3/2010 | Renz et al. | 194/206 |
| 7,724,938 B2 | 5/2010 | Pareskevakos | 382/135 |
| 7,726,457 B2 | 6/2010 | Jones et al. | 194/206 |
| 7,735,621 B2 | 6/2010 | Hallowell et al. | 194/206 |
| 7,753,189 B2 | 7/2010 | Jones et al. | 194/206 |
| 7,762,380 B2 | 7/2010 | Freeman et al. | 194/210 |
| 7,778,456 B2 | 8/2010 | Jones et al. | 382/135 |
| 7,779,982 B2 | 8/2010 | Fitzgerald et al. | 194/206 |
| 7,792,753 B1 | 9/2010 | Slater et al. | 705/45 |
| 7,806,317 B2 | 10/2010 | Laskowski | 235/379 |
| 7,817,842 B2 | 10/2010 | Mennie | 382/137 |
| 7,849,993 B2 | 12/2010 | Finkenzeller et al. | 194/206 |
| 7,849,994 B2 | 12/2010 | Klein et al. | 194/206 |
| 7,873,576 B2 | 1/2011 | Jones et al. | 705/43 |
| 7,881,519 B2 | 2/2011 | Jones et al. | 382/135 |
| 7,882,000 B2 | 2/2011 | Jones | 705/35 |
| 7,885,880 B1 | 2/2011 | Prasad et al. | 705/35 |
| 7,896,231 B2 | 3/2011 | Dcosta et al. | 235/379 |
| 7,900,829 B1 | 3/2011 | Folk et al. | 235/380 |
| 7,903,863 B2 | 3/2011 | Jones et al. | 382/135 |
| 7,929,749 B1 | 4/2011 | Jones et al. | 382/135 |
| 7,932,921 B1 | 4/2011 | Frazzitta et al. | 348/61 |
| 7,938,245 B2 | 5/2011 | Jenrick et al. | 194/206 |
| 7,949,582 B2 | 5/2011 | Mennie et al. | 705/35 |
| 7,962,411 B1 | 6/2011 | Prasad et al. | 705/45 |
| 7,974,899 B1 | 7/2011 | Prasad et al. | 705/35 |
| 8,011,581 B1 | 9/2011 | Folk et al. | 235/385 |
| 8,023,715 B2 | 9/2011 | Jones et al. | 382/135 |
| 8,041,098 B2 | 10/2011 | Jones et al. | 382/137 |
| 8,047,427 B2 | 11/2011 | Sanders et al. | 235/379 |
| 8,103,084 B2 | 1/2012 | Jones et al. | 382/140 |
| 8,125,624 B2 | 2/2012 | Jones et al. | 356/71 |
| 8,126,793 B2 | 2/2012 | Jones | 705/35 |
| 8,141,772 B1 | 3/2012 | Folk et al. | 235/379 |
| 8,162,125 B1 | 4/2012 | Csulits et al. | 194/206 |
| 8,165,958 B1 | 4/2012 | McLaughlin et al. | 705/40 |
| 8,169,602 B2 | 5/2012 | Jones et al. | 356/71 |
| 8,171,567 B1 | 5/2012 | Fraser et al. | 726/32 |
| 8,204,293 B2 | 6/2012 | Csulits et al. | 382/135 |
| 8,225,989 B1 | 7/2012 | Turocy et al. | 235/379 |
| 8,265,346 B2 | 9/2012 | Blair | 382/112 |
| 8,417,017 B1 | 4/2013 | Beutel et al. | 382/135 |
| 2001/0006556 A1 | 7/2001 | Graves et al. | 382/135 |
| 2001/0006557 A1 | 7/2001 | Mennie et al. | 382/135 |
| 2001/0015311 A1 | 8/2001 | Mennie | 194/207 |
| 2001/0018739 A1 | 8/2001 | Anderson et al. | 713/176 |
| 2001/0019624 A1 | 9/2001 | Raterman et al. | 382/135 |
| 2001/0035603 A1 | 11/2001 | Graves et al. | 271/265.01 |
| 2001/0053241 A1 | 12/2001 | Haycock | 382/135 |
| 2002/0001393 A1 | 1/2002 | Jones et al. | 382/100 |
| 2002/0020603 A1 | 2/2002 | Jones et al. | 194/346 |
| 2002/0033359 A1 | 3/2002 | Graef et al. | 209/534 |
| 2002/0037097 A1 | 3/2002 | Hoyos et al. | 382/137 |
| 2002/0056605 A1 | 5/2002 | Mazur et al. | 194/207 |
| 2002/0066637 A1 | 6/2002 | Otsuka et al. | 194/328 |
| 2002/0082993 A1 | 6/2002 | Hoyos et al. | 705/43 |
| 2002/0085245 A1 | 7/2002 | Mennie et al. | 358/498 |
| 2002/0085745 A1 | 7/2002 | Jones et al. | 382/135 |
| 2002/0100660 A1 | 8/2002 | Stieber et al. | 194/215 |
| 2002/0103757 A1 | 8/2002 | Jones et al. | 705/45 |
| 2002/0104785 A1 | 8/2002 | Klein et al. | 209/534 |
| 2002/0107801 A1 | 8/2002 | Jones et al. | 705/45 |
| 2002/0118871 A1 | 8/2002 | Jones et al. | 382/137 |
| 2002/0120572 A1 | 8/2002 | Bellucci et al. | 705/43 |
| 2002/0122580 A1 | 9/2002 | Jones et al. | 382/137 |
| 2002/0126885 A1 | 9/2002 | Mennie et al. | 382/135 |
| 2002/0126886 A1 | 9/2002 | Jones et al. | 382/135 |
| 2002/0129012 A1 | 9/2002 | Green | 707/3 |
| 2002/0131630 A1 | 9/2002 | Jones et al. | 382/137 |
| 2002/0136442 A1 | 9/2002 | Jones et al. | 382/135 |
| 2002/0145035 A1 | 10/2002 | Jones | 235/379 |
| 2002/0154804 A1 | 10/2002 | Jones et al. | 382/135 |
| 2002/0154805 A1 | 10/2002 | Jones et al. | 382/135 |
| 2002/0154806 A1 | 10/2002 | Jones et al. | 382/135 |
| 2002/0154807 A1 | 10/2002 | Jones et al. | 382/135 |
| 2002/0154808 A1 | 10/2002 | Jones et al. | 382/135 |
| 2002/0181805 A1 | 12/2002 | Loeb et al. | 382/317 |
| 2002/0186876 A1 | 12/2002 | Jones et al. | 382/135 |
| 2003/0005303 A1 | 1/2003 | Auslander et al. | 713/176 |
| 2003/0006277 A1 | 1/2003 | Maskatiya et al. | 235/379 |
| 2003/0009420 A1 | 1/2003 | Jones | 705/39 |
| 2003/0015395 A1 | 1/2003 | Hallowell et al. | 194/206 |
| 2003/0015396 A1 | 1/2003 | Mennie | 194/206 |
| 2003/0023557 A1 | 1/2003 | Moore | 705/50 |
| 2003/0059098 A1 | 3/2003 | Jones et al. | 382/135 |
| 2003/0062242 A1 | 4/2003 | Hallowell et al. | 194/302 |
| 2003/0080032 A1 | 5/2003 | Heidi et al. | 209/534 |
| 2003/0081824 A1 | 5/2003 | Mennie et al. | 382/135 |
| 2003/0085271 A1 | 5/2003 | Laskowski | 235/379 |
| 2003/0099379 A1 | 5/2003 | Monk et al. | 382/115 |
| 2003/0108233 A1 | 6/2003 | Raterman et al. | 382/135 |
| 2003/0121752 A1 | 7/2003 | Stromme et al. | 194/207 |
| 2003/0121753 A1 | 7/2003 | Stromme et al. | 194/207 |
| 2003/0128240 A1 | 7/2003 | Martinez et al. | 345/764 |
| 2003/0132281 A1 | 7/2003 | Jones et al. | 235/379 |
| 2003/0139994 A1 | 7/2003 | Jones | 705/36 |
| 2003/0168308 A1 | 9/2003 | Maier et al. | 194/207 |
| 2003/0174874 A1 | 9/2003 | Raterman et al. | 382/135 |
| 2003/0182217 A1 | 9/2003 | Chiles | 705/35 |
| 2003/0183685 A1 | 10/2003 | Steele Moore et al. | 235/379 |
| 2003/0198373 A1 | 10/2003 | Raterman et al. | 382/135 |
| 2003/0201318 A1 | 10/2003 | Graef et al. | 235/379 |
| 2003/0202690 A1 | 10/2003 | Jones et al. | 382/139 |
| 2003/0233317 A1 | 12/2003 | Judd | 705/39 |
| 2004/0003980 A1 | 1/2004 | Hallowell et al. | 194/206 |
| 2004/0016621 A1 | 1/2004 | Jenrick et al. | 194/206 |
| 2004/0016797 A1 | 1/2004 | Jones et al. | 235/379 |
| 2004/0028266 A1 | 2/2004 | Jones et al. | 382/135 |
| 2004/0037456 A1 | 2/2004 | Haycock | 382/135 |
| 2004/0083149 A1 | 4/2004 | Jones | 705/35 |
| 2004/0131230 A1 | 7/2004 | Paraskevakos | 382/100 |
| 2004/0145726 A1 | 7/2004 | Csulits et al. | 356/71 |
| 2004/0149538 A1 | 8/2004 | Sakowski | 194/207 |
| 2004/0153408 A1 | 8/2004 | Jones et al. | 705/43 |
| 2004/0154964 A1 | 8/2004 | Jones | 209/534 |
| 2004/0173432 A1 | 9/2004 | Jones | 194/216 |
| 2004/0182675 A1 | 9/2004 | Long et al. | 194/206 |
| 2004/0238619 A1 | 12/2004 | Nagasaka et al. | 235/379 |
| 2004/0251110 A1 | 12/2004 | Jenrick et al. | 194/207 |
| 2005/0029168 A1 | 2/2005 | Jones et al. | 209/534 |
| 2005/0035034 A1 | 2/2005 | Long et al. | 209/534 |
| 2005/0040225 A1 | 2/2005 | Csulits et al. | 235/379 |

(56) References Cited

U.S. PATENT DOCUMENTS

| | | | |
|---|---|---|---|
| 2005/0045448 A1 | 3/2005 | Sugano et al. | 194/207 |
| 2005/0047642 A1 | 3/2005 | Jones et al. | 382/137 |
| 2005/0060055 A1 | 3/2005 | Hallowell et al. | 700/95 |
| 2005/0060059 A1 | 3/2005 | Klein et al. | 700/213 |
| 2005/0060061 A1 | 3/2005 | Jones | 700/226 |
| 2005/0077142 A1 | 4/2005 | Tam et al. | 194/217 |
| 2005/0086271 A1 | 4/2005 | Jones et al. | 707/200 |
| 2005/0087422 A1 | 4/2005 | Maier et al. | 194/207 |
| 2005/0108164 A1 | 5/2005 | Salafia et al. | 705/42 |
| 2005/0108165 A1 | 5/2005 | Jones et al. | 705/43 |
| 2005/0117791 A2 | 6/2005 | Raterman et al. | 382/135 |
| 2005/0117792 A2 | 6/2005 | Graves et al. | 382/135 |
| 2005/0150738 A1 | 7/2005 | Hallowell et al. | 194/206 |
| 2005/0151995 A1 | 7/2005 | Hauser et al. | 358/1.15 |
| 2005/0163361 A1 | 7/2005 | Jones et al. | 382/135 |
| 2005/0163362 A1 | 7/2005 | Jones et al. | 382/137 |
| 2005/0169511 A1 | 8/2005 | Jones | 382/135 |
| 2005/0173221 A1 | 8/2005 | Maier et al. | 194/207 |
| 2005/0183928 A1 | 8/2005 | Jones et al. | 194/207 |
| 2005/0207634 A1 | 9/2005 | Jones et al. | 382/135 |
| 2005/0213803 A1 | 9/2005 | Mennie et al. | 382/135 |
| 2005/0241909 A1 | 11/2005 | Mazur et al. | 194/207 |
| 2005/0249394 A1 | 11/2005 | Jones et al. | 382/135 |
| 2005/0258235 A1 | 11/2005 | Silverbrook et al. | 235/379 |
| 2005/0265591 A1 | 12/2005 | Jones et al. | 382/135 |
| 2005/0267843 A1 | 12/2005 | Acharya et al. | 705/42 |
| 2005/0276458 A1 | 12/2005 | Jones et al. | 382/135 |
| 2005/0278239 A1 | 12/2005 | Jones et al. | 705/35 |
| 2005/0281450 A1 | 12/2005 | Richardson | 382/139 |
| 2005/0289030 A1 | 12/2005 | Smith | 705/35 |
| 2006/0010071 A1 | 1/2006 | Jones et al. | 705/42 |
| 2006/0016883 A1 | 1/2006 | Silva et al. | 235/381 |
| 2006/0054454 A1 | 3/2006 | Oh | 194/207 |
| 2006/0078186 A1 | 4/2006 | Freeman et al. | 382/135 |
| 2006/0106717 A1 | 5/2006 | Randle et al. | 705/45 |
| 2006/0124724 A1 | 6/2006 | Kotovich et al. | 235/379 |
| 2006/0136317 A1 | 6/2006 | Mizrah | 705/35 |
| 2006/0182330 A1 | 8/2006 | Chiles | 382/135 |
| 2006/0195567 A1 | 8/2006 | Mody et al. | 709/224 |
| 2006/0210137 A1 | 9/2006 | Raterman et al. | 382/135 |
| 2006/0213979 A1 | 9/2006 | Geller et al. | 235/380 |
| 2006/0274929 A1 | 12/2006 | Jones et al. | 382/135 |
| 2007/0040014 A1 | 2/2007 | Zhao et al. | 235/379 |
| 2007/0064991 A1 | 3/2007 | Douglas et al. | 382/137 |
| 2007/0071302 A1 | 3/2007 | Jones et al. | 382/135 |
| 2007/0076939 A1 | 4/2007 | Jones et al. | 382/135 |
| 2007/0078560 A1 | 4/2007 | Jones et al. | 700/224 |
| 2007/0095630 A1 | 5/2007 | Mennie et al. | 194/206 |
| 2007/0102863 A1 | 5/2007 | Burns et al. | 271/3.01 |
| 2007/0112674 A1 | 5/2007 | Jones et al. | 705/42 |
| 2007/0122023 A1 | 5/2007 | Jenrick et al. | 382/135 |
| 2007/0172106 A1 | 7/2007 | Paraskevakos | 382/135 |
| 2007/0172107 A1 | 7/2007 | Jones et al. | 382/137 |
| 2007/0209904 A1 | 9/2007 | Freeman et al. | 194/210 |
| 2007/0221470 A1 | 9/2007 | Mennie et al. | 194/216 |
| 2007/0237381 A1 | 10/2007 | Mennie et al. | 382/135 |
| 2007/0258633 A1 | 11/2007 | Jones et al. | 382/135 |
| 2007/0269097 A1 | 11/2007 | Chiles et al. | 382/135 |
| 2007/0278064 A1 | 12/2007 | Hallowell et al. | 194/206 |
| 2007/0288382 A1 | 12/2007 | Narayanan et al. | 705/45 |
| 2007/0291328 A1 | 12/2007 | Furihata et al. | 358/498 |
| 2008/0006505 A1 | 1/2008 | Renz et al. | 194/206 |
| 2008/0033829 A1 | 2/2008 | Mennie et al. | 705/16 |
| 2008/0037856 A1 | 2/2008 | Paraskevakos | 382/140 |
| 2008/0044077 A1 | 2/2008 | Mennie et al. | 382/135 |
| 2008/0052189 A1 | 2/2008 | Walker et al. | 705/26 |
| 2008/0060906 A1 | 3/2008 | Fitzgerald et al. | 194/207 |
| 2008/0099555 A1 | 5/2008 | Silva et al. | 235/381 |
| 2008/0123932 A1 | 5/2008 | Jones et al. | 382/135 |
| 2008/0133411 A1 | 6/2008 | Jones et al. | 705/42 |
| 2008/0141126 A1 | 6/2008 | Johnson et al. | 715/273 |
| 2008/0177420 A1 | 7/2008 | Klein et al. | 700/224 |
| 2008/0219543 A1 | 9/2008 | Csulits et al. | 382/135 |
| 2008/0220707 A1 | 9/2008 | Jones et al. | 453/2 |
| 2008/0285838 A1 | 11/2008 | Jones et al. | 382/135 |
| 2009/0001661 A1 | 1/2009 | Klein et al. | 271/258.01 |
| 2009/0013653 A1 | 1/2009 | Sekiguchi | 53/531 |
| 2009/0022390 A1 | 1/2009 | Yacoubian et al. | 382/135 |
| 2009/0087076 A1 | 4/2009 | Jenrick | 382/135 |
| 2009/0090779 A1 | 4/2009 | Freeman | 235/450 |
| 2009/0141962 A1 | 6/2009 | Borgia et al. | 382/139 |
| 2009/0144620 A1 | 6/2009 | Bauchot et al. | 715/277 |
| 2009/0145959 A1 | 6/2009 | VanKirk et al. | 235/379 |
| 2009/0148025 A1 | 6/2009 | Calman | 382/135 |
| 2009/0148027 A1 | 6/2009 | Paraskevakos | 382/135 |
| 2009/0183967 A1 | 7/2009 | Hamasaki | 194/320 |
| 2009/0188974 A1 | 7/2009 | Haycock et al. | 235/379 |
| 2009/0236200 A1 | 9/2009 | Hallowell et al. | 194/215 |
| 2009/0310188 A1 | 12/2009 | Jones et al. | 358/448 |
| 2009/0313159 A1 | 12/2009 | Jones et al. | 705/35 |
| 2010/0034454 A1 | 2/2010 | Jones et al. | 382/137 |
| 2010/0051687 A1 | 3/2010 | Jones et al. | 235/379 |
| 2010/0057617 A1 | 3/2010 | Jones et al. | 705/44 |
| 2010/0063916 A1 | 3/2010 | Jones et al. | 705/35 |
| 2010/0092065 A1 | 4/2010 | Jones et al. | 382/135 |
| 2010/0108463 A1 | 5/2010 | Renz et al. | 194/206 |
| 2010/0116619 A1 | 5/2010 | Jones | 194/217 |
| 2010/0163366 A1 | 7/2010 | Jenrick et al. | 194/206 |
| 2010/0236892 A1 | 9/2010 | Jones et al. | 194/206 |
| 2010/0263984 A1 | 10/2010 | Freeman et al. | 194/206 |
| 2010/0276485 A1 | 11/2010 | Jones et al. | 235/379 |
| 2010/0303111 A1 | 12/2010 | Kupershmidt | 372/32 |
| 2010/0306111 A1 | 12/2010 | Slater et al. | 705/45 |
| 2010/0312705 A1 | 12/2010 | Caruso et al. | 705/45 |
| 2011/0035316 A2 | 2/2011 | Morgan et al. | 705/39 |
| 2011/0042178 A1 | 2/2011 | Luecking | 194/302 |
| 2011/0087599 A1 | 4/2011 | Jones | 705/45 |
| 2011/0099105 A1 | 4/2011 | Mennie et al. | 705/41 |
| 2011/0170761 A1 | 7/2011 | Fu | 382/135 |
| 2011/0206267 A1 | 8/2011 | Jones et al. | 382/139 |
| 2011/0215034 A1 | 9/2011 | Mennie et al. | 209/534 |
| 2011/0220717 A1 | 9/2011 | Jones et al. | 235/380 |
| 2011/0255767 A1 | 10/2011 | Jenrick et al. | 382/135 |
| 2011/0258113 A1 | 10/2011 | Jones et al. | 705/39 |
| 2012/0008131 A1 | 1/2012 | Jones et al. | 356/71 |
| 2012/0008850 A1 | 1/2012 | Jones et al. | 382/135 |
| 2012/0013891 A1 | 1/2012 | Jones et al. | 356/71 |
| 2012/0013892 A1 | 1/2012 | Jones et al. | 356/71 |
| 2012/0054099 A1 | 3/2012 | Fox et al. | 705/43 |
| 2012/0077476 A1 | 3/2012 | Paraskevakos et al. | 455/414.2 |
| 2012/0101947 A1 | 4/2012 | Hawkins | 705/45 |
| 2012/0150745 A1 | 6/2012 | Csulits et al. | 705/45 |
| 2012/0189186 A1 | 7/2012 | Csulits et al. | 382/135 |
| 2012/0313316 A1 | 12/2012 | Yamamoto et al. | 271/220 |

FOREIGN PATENT DOCUMENTS

| | | | | |
|---|---|---|---|---|
| DE | 28 24 849 A1 | 12/1979 | | G07F 7/00 |
| EP | 0 030 413 A1 | 6/1981 | | G07F 7/02 |
| EP | 0 071 421 A2 | 2/1983 | | G07D 7/00 |
| EP | 0 077 464 A2 | 4/1983 | | G03H 1/08 |
| EP | 0 083 062 A2 | 7/1983 | | G07D 7/00 |
| EP | 0 101 115 A1 | 2/1984 | | G07D 7/00 |
| EP | 0 109 743 A2 | 5/1984 | | G07D 1/00 |
| EP | 0 185 200 A2 | 6/1986 | | G06F 3/14 |
| EP | 0 253 935 A2 | 1/1988 | | G06K 7/10 |
| EP | 0 314 312 A2 | 5/1989 | | G07D 7/00 |
| EP | 0 325 364 A2 | 7/1989 | | H04N 1/46 |
| EP | 0 338 123 A2 | 10/1989 | | G07D 7/00 |
| EP | 0 342 647 A2 | 11/1989 | | G07D 7/00 |
| EP | 0 402 627 A1 | 12/1990 | | H01R 17/12 |
| EP | 0 416 960 A1 | 3/1991 | | G07F 7/10 |
| EP | 0416 916 A2 | 3/1991 | | G07F 7/10 |
| EP | 0 473 106 A2 | 3/1992 | | G07D 1/00 |
| EP | 0 548 142 A1 | 6/1993 | | G06K 19/08 |
| EP | 0 578 875 A1 | 1/1994 | | G06F 15/68 |
| EP | 0 583 526 A1 | 2/1994 | | G06K 7/00 |
| EP | 0 583 723 A1 | 2/1994 | | G06K 7/00 |
| EP | 0 593 209 A2 | 4/1994 | | H04L 29/06 |
| EP | 0 612 042 A2 | 8/1994 | | G07D 7/00 |
| EP | 0 613 107 A1 | 8/1994 | | G07F 19/00 |
| EP | 0 616 296 A2 | 9/1994 | | G06K 9/20 |
| EP | 0 686 292 A1 | 9/1994 | | G07D 7/00 |
| EP | 0 632 415 A1 | 1/1995 | | G07F 7/10 |

(56) References Cited

FOREIGN PATENT DOCUMENTS

| | | | | |
|---|---|---|---|---|
| EP | 0 633 533 A2 | 1/1995 | | G07F 15/00 |
| EP | 0 633 552 A2 | 1/1995 | | G07C 5/00 |
| EP | 0 633 553 A1 | 1/1995 | | G07D 7/00 |
| EP | 0 661 654 A2 | 7/1995 | | G06F 17/60 |
| EP | 0 671 696 A1 | 9/1995 | | G06F 17/30 |
| EP | 0 708 419 A1 | 4/1996 | | G07D 7/00 |
| EP | 0 718 809 A2 | 6/1996 | | G07D 7/00 |
| EP | 0 760 987 A1 | 9/1996 | | G07D 7/00 |
| EP | 0 824 736 A1 | 11/1996 | | G07D 7/00 |
| EP | 1 004 089 A1 | 6/1998 | | G06K 9/00 |
| EP | 0 984 410 A1 | 3/2000 | | G07F 19/00 |
| EP | 1 028 359 A1 | 8/2000 | | G03H 1/18 |
| EP | 1 041 523 A2 | 10/2000 | | G07F 7/10 |
| EP | 1 134 704 A1 | 9/2001 | | G07D 7/00 |
| EP | 1 160 737 A1 | 12/2001 | | G07D 3/00 |
| EP | 1 437 692 A1 | 7/2004 | | G07D 11/00 |
| EP | 1 019 869 A1 | 10/2006 | | G06K 9/78 |
| EP | 1 480 177 B1 | 11/2007 | | G07F 19/00 |
| EP | 1 008 096 A2 | 1/2008 | | |
| FR | 2 539 898 A1 | 7/1984 | | G07D 7/00 |
| FR | 2 722 316 A1 | 1/1996 | | G07D 7/00 |
| GB | 2 038 063 A | 7/1980 | | G07D 7/00 |
| GB | 2 190 996 A | 12/1987 | | G06K 5/00 |
| GB | 2 204 166 A | 11/1988 | | G06M 9/02 |
| GB | 2 272 762 A | 5/1994 | | G01N 21/88 |
| GB | 2 355 522 A | 4/2001 | | G07D 7/00 |
| GB | 2 464 826 A | 5/2010 | | G07D 11/00 |
| JP | 62-220843 A | 9/1987 | | G01N 21/89 |
| JP | 63-073497 A | 4/1988 | | G07D 9/00 |
| JP | 02-012492 A | 1/1990 | | G07D 7/00 |
| JP | 04-131986 A | 5/1992 | | G07D 9/00 |
| JP | 04-243497 A | 8/1992 | | G07D 9/00 |
| JP | 06-203248 A | 7/1994 | | G07D 9/00 |
| JP | 07-168857 A | 7/1995 | | G07F 17/40 |
| WO | WO 85/02148 A1 | 5/1985 | | B42D 15/00 |
| WO | WO 87/06041 A1 | 10/1987 | | G07D 7/00 |
| WO | WO 90/07165 A1 | 6/1990 | | G07D 7/00 |
| WO | WO 91/11778 A1 | 8/1991 | | G06K 9/00 |
| WO | WO 92/04692 A1 | 3/1992 | | G06K 19/08 |
| WO | WO 92/14221 A1 | 8/1992 | | G07D 7/00 |
| WO | WO 92/16931 A2 | 10/1992 | | |
| WO | WO 92/17394 A1 | 10/1992 | | B65H 3/06 |
| WO | WO 93/23824 A1 | 11/1993 | | G06K 9/00 |
| WO | WO 94/06102 A1 | 3/1994 | | G07D 7/00 |
| WO | WO 94/16412 A1 | 7/1994 | | G07D 7/00 |
| WO | WO 94/19773 A1 | 9/1994 | | G07D 7/00 |
| WO | WO 95/10088 A1 | 4/1995 | | G06F 15/30 |
| WO | WO 95/19019 A2 | 7/1995 | | G07D 7/00 |
| WO | WO 95/24691 A1 | 9/1995 | | G06K 9/00 |
| WO | WO 96/03719 A1 | 2/1996 | | G07F 7/10 |
| WO | WO 96/10800 A1 | 4/1996 | | G06K 9/00 |
| WO | WO 96/29683 A1 | 9/1996 | | G07D 7/00 |
| WO | WO 96/36021 A1 | 11/1996 | | G07D 7/00 |
| WO | WO 96/36933 A1 | 11/1996 | | G06K 9/00 |
| WO | WO 97/05583 A1 | 2/1997 | | G07F 7/10 |
| WO | WO 97/29459 A1 | 8/1997 | | G07D 7/00 |
| WO | WO 97/30422 A1 | 8/1997 | | G07D 7/00 |
| WO | WO 97/43734 A1 | 11/1997 | | G06K 9/00 |
| WO | WO 97/45810 A1 | 12/1997 | | G07D 7/00 |
| WO | WO 98/12662 A1 | 3/1998 | | G06K 9/00 |
| WO | WO 98/13785 A1 | 4/1998 | | G06K 9/46 |
| WO | WO 98/24041 A1 | 6/1998 | | G06F 17/60 |
| WO | WO 98/24052 A1 | 6/1998 | | G06K 9/00 |
| WO | WO 98/24067 A1 | 6/1998 | | G07D 3/14 |
| WO | WO 98/26364 A1 | 6/1998 | | G06F 17/60 |
| WO | WO 98/35323 A2 | 8/1998 | | |
| WO | WO 98/40839 A2 | 9/1998 | | |
| WO | WO 98/47100 A1 | 10/1998 | | G06K 9/78 |
| WO | WO 98/50892 A1 | 11/1998 | | G07D 7/00 |
| WO | WO 98/51082 A1 | 11/1998 | | H04N 7/18 |
| WO | WO 99/00776 A1 | 1/1999 | | G07F 9/06 |
| WO | WO 99/09511 A1 | 2/1999 | | G06K 9/00 |
| WO | WO 99/14668 A1 | 3/1999 | | G06F 9/445 |
| WO | WO 99/23601 A1 | 5/1999 | | G06K 9/00 |
| WO | WO 99/41695 A1 | 8/1999 | | G06K 5/00 |
| WO | WO 99/48040 A1 | 9/1999 | | G06K 9/00 |
| WO | WO 99/48042 A1 | 9/1999 | | G06K 9/20 |
| WO | WO 99/50795 A1 | 10/1999 | | G07D 1/00 |
| WO | WO 99/50796 A1 | 10/1999 | | G07D 7/00 |
| WO | WO 00/24572 A1 | 5/2000 | | B31F 1/00 |
| WO | WO 00/58876 A1 | 10/2000 | | G06F 17/60 |
| WO | WO 00/65546 A1 | 11/2000 | | G07F 1/04 |
| WO | WO 01/08108 A2 | 2/2001 | | |
| WO | WO 01/59685 A2 | 8/2001 | | G06K 9/00 |
| WO | WO 01/59723 A1 | 8/2001 | | G07F 7/04 |
| WO | WO 02/29735 A2 | 4/2002 | | G07D 7/00 |
| WO | WO 02/054360 A2 | 7/2002 | | G07D 11/00 |
| WO | WO 03/005312 A1 | 1/2003 | | G07F 19/00 |
| WO | WO 03/028361 A2 | 4/2003 | | |
| WO | WO 03/029913 A2 | 4/2003 | | |
| WO | WO 03/030113 A1 | 4/2003 | | G07F 7/04 |
| WO | WO 03/067532 A1 | 8/2003 | | G07F 7/04 |
| WO | WO 03/107282 A2 | 12/2003 | | |
| WO | WO 2004/010367 A1 | 1/2004 | | G06K 5/00 |
| WO | WO 2004/027717 A2 | 4/2004 | | |
| WO | WO 2004/036508 A2 | 4/2004 | | G07D 7/12 |
| WO | WO 2004/038631 A2 | 5/2004 | | G06F 17/60 |
| WO | WO 2004/068422 A1 | 8/2004 | | G07D 11/00 |
| WO | WO 2005/013209 A2 | 2/2005 | | G07D 11/00 |
| WO | WO 2005/017842 A1 | 2/2005 | | G07D 11/00 |
| WO | WO 2005/028348 A2 | 3/2005 | | B65H 1/00 |
| WO | WO 2005/029240 A2 | 3/2005 | | |
| WO | WO 2005/036445 A1 | 4/2005 | | G06F 19/00 |
| WO | WO 2005/041134 A2 | 5/2005 | | |
| WO | WO 2005/076229 A1 | 8/2005 | | G07D 7/12 |
| WO | WO 2006/039439 A2 | 4/2006 | | G06K 9/00 |
| WO | WO 2006/076289 A2 | 7/2006 | | G07D 11/00 |
| WO | WO 2006/076634 A2 | 7/2006 | | G06Q 90/00 |
| WO | WO 2007/044570 A2 | 4/2007 | | G07D 11/00 |
| WO | WO 2007/120825 A2 | 10/2007 | | G06K 9/00 |
| WO | WO 2007/143128 A2 | 12/2007 | | B65H 29/12 |
| WO | WO 2008/030356 A1 | 3/2008 | | G06K 7/00 |
| WO | WO 2008/112132 A1 | 9/2008 | | G06K 9/00 |
| WO | WO 2009/081085 A1 | 7/2009 | | G07D 11/00 |
| WO | WO 2011/109569 A1 | 9/2011 | | G07D 11/00 |

OTHER PUBLICATIONS

AFB: AFB Currency Recognition System, 1 page (1982).
ASCOM: Cashflow Emerald, 2 pages, (date unknown, prior to Jan. 15, 2001).
ATM Cardpay Corp: "ATM Cardpay Introduces New Bill Payment Idea," Retail Delivery Systems News, vol. 3, Iss. 1, p. 1; 2 pages (Jan. 16, 1998).
ATM Cardpay Corp: "'The Next Generation of ATM Network Survival.' ATM Cardpay Shows Switches How to Win Bill Presentment/Payments Market," EFT Report, vol. 20, Iss. 17, p. 1; 3 pages (Aug. 27, 1997).
AUI: Coinverter—"No More Lines . . . Self-Serve Cash-Out," by Cassius Elston, 1995 World Games Congress/Exposition Converter, 1 page (dated prior to 1995).
Barton, Louis L., "Check Processing Operations"—A Hands-on Guide to Developing and Managing a State-of-the-Art Check Processing Operation, Chp. 8 and App. 2, 31 pages (1994).
Brandt: Mach 7 High-Speed Coin Sorter/Counter, 2 pages (1992).
Brandt: Model 8904 Upfeed—"High Speed 4-Denomination Currency Dispenser," 2 pages (1989).
Cummins: JetScan™ Model 4060, Currency Scanner/Counter, Operator's Manual, 43 pages (Aug. 1991).
Cummins: JetScan™ Model 4060, Sale of JetScan Currency Scanner/Counter, 1 page (Aug. 1991).
Cummins: JetScan™ Model 4061, Currency Scanner/Counter—Operating Instructions, 47 pages (Apr. 20, 1993).
Cummins: JetScan™ Model 4061, Sale of JetScan Currency Scanner/Counter, 1 page (Apr. 20, 1993).
Cummins: JetScan™ Model 4062, Currency Scanner/Counter—Operating Instructions (022-7120-00), 53 pages (Nov. 28, 1994).
Cummins: JetScan™ Model 4062, Sale of JetScan Currency Scanner/Counter, Model 4062, 1 page (Nov. 28, 1994).
Cummins: JetSort® High Speed Sorter/Counter Kits I & J—Operating Instructions (Form 022-7123-00) 12 pages (1994).

(56) References Cited

OTHER PUBLICATIONS

Currency Systems International: Mr. W. Kranister in Conversation with Richard Haycock, 5 pages (estimated 1994).
Currency Systems International: CPS 300 Currency Processing System, 4 pages (© 1992).
Currency Systems International: CPS 600/900, Medium Speed Currency Sorting Family, CPS 600 and CPS 900, 4 pages (© 1994).
Currency Systems International: CPS 600/900, Description of CSI CPS 600 and CPS 900 devices, 1 page (date: estimated 1994).
De La Rue: CDS 5700 and CDS 5800 Cash Deponier System (German) and translation, 7 pages (date unknown, prior to Aug. 13, 1996).
EP App. No. 04 020 193.1 [claiming priority to U.S. Appl. No. 60/043,516], European Patent Office, Communication pursuant to Article 96(2), Discussion of FR 2 722 316, 4 pages (Jul. 18, 2005).
Elcom International Inc: PECOS Internet Procurement Manager, "Elcom.com and Visa Announce Systems Link to Offer B2B Ecommerce Solutions," PRNewsire, 4 pages (Nov. 29, 1999).
Glory: CRS-8000 Cash Redemption System, 2 pages (1996).
Glory: GFB-200/210/220/230 DeskTop Bank Note Counter brochure, 2 pages (estimated before Aug. 9, 1994).
Glory: GSA-500 Sortmaster brochure, 2 pages (estimated Jan. 14, 1994).
Glory: System 8000 Recycle Currency Processing Teller System, p. 5 of General Catalogue of Glory Products, 2 pages (1995).
Glory: UF-1D brochure and translation, 2 pages (estimated before Aug. 9, 1994).
ISH Electronic: ISH 12005/500 Coin Counter (with translation), 4 pages (date unknown, prior to Aug. 1996).
ISH Electronic: ISH 12005/501 Self-Service Unit (with translation), 4 pages (date unknown, prior to Aug. 1996).
J&B Software Inc.: TMS Image, "J&B Software Announces New Successes for TMS Image™ Remittance," PRNewswire, 2 pages (Mar. 23, 1998).
NGZ Geldzahlmaschinengesellschaft: NGZ 2100 Automated Coin Depository, 4 pages (date unknown, prior to Sep. 1996).
Perconta: Cassomat A.C.S. Automated Cash System Types I and II, 6 pages (1998).
Perconta: Contomat Coin Settlement Machine for Customer Self Service, 2 pages (date unknown, prior to Apr. 2003).
Prema GmbH: Prema 405 (RE) Self Service Coin Deposit Facility, 2 pages (date unknown, prior to Apr. 2003).
Reis Eurosystems: CRS 6501/CRS 6510 Cash Receipt Systems for Self-Service Area, 3 pages (date unknown, prior to Apr. 2003).
Scan Coin: CDS 600 Cash Deposit System, 2 pages (1994).
Scan Coin: CDS 640 Cash Deposit System, "With Scan Coin's customer operated coin deposit system . . . ," 2 pages (date unknown, prior to Apr. 2003).
ShieldSpec LLC: Currency Manager for Law Enforcement, 1 page (downloaded from www.shieldspec.com/product.html on Aug. 18, 2010).
ShieldSpec LLC: Presentation on Currency Manager for Law Enforcement, 10 pages (downloaded from www.shieldspec.com/documents/CurrencyManagerLawEnforcement.pdf on Aug. 18, 2010), © 2005.
Toshiba/(Mosler): CF-400 Series Fitness Sorter, 6 pages (estimated 1989 or earlier).
(Toshiba)/Mosler: CF-420 Cash Management System—Operator's Manual, 137 pages (© 1989).
Toshiba/Mosler: CF-420—Description of Toshiba/Mosler CF-420 Device, 1 page (date estimated 1989).
Toshiba/Mosler: CF-420—Revised drawings of portions of Mosler CF-420 Cash Management System (Figs. A-C) and description of the same, 4 pages (1989).
Vector Tech.: Document Imaging Product Demonstration video on CD in .wmv format (Jun. 1996).
EP 1 004 089, which claims the benefit of PCT/US1997/021548, which claims priority to U.S. Appl. No. 60/031,604, filed Nov. 27, 1996; Communication of a Notice of Opposition; Giesecke & Devrient; mailed Aug. 5, 2008; partial English translation dated Aug. 12, 2008; 87 pages.
EP 1 004 089, which claims the benefit of PCT/US1997/021548, which claims priority to U.S. Appl. No. 60/031,604, filed Nov. 27, 1996; Communication of Notice of Opposition; De La Rue; mailed Jul. 28, 2008; 21 pages.
EP 1 008 096, which claims the benefit of PCT/US1998/004664, which claims priority to U.S. Appl. No. 08/814,978, filed Mar. 11, 1997; Communication of a Notice of Opposition; Talaris; mailed Oct. 9, 2008; 17 pages.
EP 1 008 096, which claims the benefit of PCT/US1998/004664, which claims priority to U.S. Appl. No. 08/814,978, filed Mar. 11, 1997; Communication of a Notice of Opposition; De La Rue; mailed Oct. 9, 2008; 10 pages.
EP 1 019 869, which claims the benefit of PCT/US1998/007443, which claims priority to U.S. Appl. No. 60/043,516, filed Apr. 14, 1997; Communication of a Notice of Opposition; De La Rue; mailed Jul. 19, 2007; 12 pages.
EP 1 019 869, which claims the benefit of PCT/US1998/007443, which claims priority to U.S. Appl. No. 60/043,516, filed Apr. 14, 1997; Preliminary Opinion of the Opposition Division; mailed Nov. 18, 2008; 15 pages.
EP 1 480 177, which is a divisional of EP application No. 98915542.9, now EP 1 019 869, which claims priority to U.S. Appl. No. 60/043,516, filed Apr. 14, 1997; Communication of a Notice of Opposition; Giesecke & Devrient; mailed Aug. 12, 2008; partial English translation dated Aug. 12, 2008; 23 pages.
Glory: GFF-8CF and GFF-8 Desktop Currency and Check Counter, 4 pages (date estimated Jan. 1994).
Hayosh, Thomas D, "The History of the Check and Standardization Efforts," 5 pages, dated Sep. 26, 1995, available at http://home.comcast.net/~hayosh/HISTMICR.pdf (visited Sep. 22, 2011).
NCR: Intelligent Deposit ATM's, "Mixes of cash, checks no problem with Regions Bank ATMs," article, 2 pages (Jun. 10, 2009).
U.S. Appl. No. 13/166,978, filed Jun. 23, 2011, Jones et al, Document Processing System Using Full Image Scanning.
U.S. Appl. No. 13/240,086, filed Sep. 22, 2011, Jones et al., Check and U.S. Bank Note Processing Device and Method.
U.S. Appl. No. 13/240,097, filed Sep. 22, 2011, Jones et al., Check and U.S. Bank Note Processing Device and Method.
U.S. Appl. No. 13/240,106, filed Sep. 22, 2011, Jones et al., Check and U.S. Bank Note Processing Device and Method.
U.S. Appl. No. 13/240,122, filed Sep. 22, 2011, Jones et al., Check and U.S. Bank Note Processing Device and Method.
U.S. Appl. No. 13/402,633, filed Feb. 22, 2012, Csulits et al., Document Imaging and Processing System.
U.S. Appl. No. 13/404,774, filed Feb. 24, 2012, John E. Jones, Automated Payment System and Method.
U.S. Appl. No. 13/437,691, filed Apr. 2, 2012, Csulits et al., Apparatus and System for Imaging Currency Bills and Financial Documents and Method for Using the Same.
BARS: 5000 Currency Sorter, 6 pages(estimated prior to Aug. 13, 2003).
BARS: 5600 Currency Sorter, 6 pages (estimated prior to Aug. 12, 2003).
BARS: 6000 Single Note Inspection System, 6 pages (estimated prior to Aug. 12, 2003).
De La Rue: 2700 Currency Counting Machine—User Guide, Revision 1, 53 pages (Aug. 26, 1999).
Cummins: JetScan™ iFX i100 Series Currency Scanner brochure (Form 023-1789), 6 pages (May 2009).
Cummins: JetScan™ iFX i100 Series Currency Scanner brochure (Form 023-1789, Rev. 1), 6 pages (Sep. 2009).
Cummins: JetScan™ iFX i100 Series Currency Scanner brochure (Form 023-1789, Rev. 2), 6 pages (© 2010).
Cummins: JetScan™ iFX Series i100 shell, "The Next Generation JetScan," (Form 023-1792), 2 pages (May 2009).
Cummins: JetScan™ iFX i100 Series Currency Scanner brochure, "Ideal for Law Enforcement Applications," (Form 023-1798), 1 page (Sep. 2009).
Cummins: JetScan™ iFX i100 Series Currency Scanner mailer, "Don't Let the Evidence Get Away!," (Form 023-1799), 2 pages (Sep. 2009).

(56) References Cited

OTHER PUBLICATIONS

Cummins: JetScan™ iFX i100 Series Currency Scanner mailer, "Two departments just made large drug busts . . . ," (Form 023-1820), 3 pages (Jun. 2010).
Cummins: JetScan™ iFX i100 Series Currency Scanner, Operating Instructions (Form 022-7614-00), 108 pages (Oct. 2010).
Cummins: JetScan™ iFX i100 Series Currency Scanner brochure, "Advanced Evidence Processing for Law Enforcement," (Form 023-1816), 6 pages (© 2010).
Cummins: JetScan™ iFX Series i100 brochure, "The Next Generation JetScan," (Form 023-1792 Rev. 1), 2 pages (Mar. 2011).
Cummins: JetScan™ iFX i100 Series, Quick Reference (022-7631-00), 28 pages (Mar. 2011).
Cummins: JetScan™ iFX i100 Currency and Check Processor website, "Revolutionizing the way you process currency and checks," (http://ifx.cumminsallison.com/models/i100), 2 pages (Jul. 2011).
Cummins: JetScan™ iFX Series i100 Currency and Check Solution brochure, "Never process a check or bill the same way again," (Form 023-1858), 6 pages (© 2011).
Cummins: JetScan™ iFX Series i100 Currency and Check Scanner brochure, "Never process a check or bill the same way again," (Form 023-1858), 6 pages (© 2011) [downloaded Jul. 20, 2011].
Cummins: JetScan™ iFX Series i100 Currency Scanner brochure, "Never Photocopy a Bill Again," (Form 023-1863), 4 pages (© 2011).
Cummins: JetScan™ iFX Series i200 Currency Scanner brochure, "20%, 60% Fewer Rejects," (Form 023-1859), 6 pages (© 2011).
Cummins: JetScan™ iFX i400 Series, Quick Reference (022-7669-00), 20 pages (May 2011).
Cummins: JetScan™ iFX i400 Series Currency Scanner, Operating Instructions (Form 022-7666-00), 87 pages (May 2011).
Cummins: JetScan™ iFX Series i400 Multi-Pocket Sorter brochure, "Smallest, fastest, most flexible multi-pocket sorter," (Form 023-1860), 6 pages (© 2011).
Cummins: JetScan™ iFX Image-Management Software, Operating Instructions (022-7615-00), 58 pages (Jul. 2011).
Document Solutions Inc.: Image Solution, DialogWeb, "Bank Gets Big Response to Image Statements", Electronic Imaging Report, vol. 2, No. 9, 3 pages (May 6, 1992 ).
Litton Integrated Automation: Proceedings, SPIE—International Society for Optical Engineering, Optical Security and Anticounterfeiting Systems (vol. 1210), "High Speed Print Quality Inspection and Verification," by Cynthia Ott and Nagesh Chowla re Mavis, 9 pages (Jan. 1990) [GL 010713-21].
NCR: NCR 5685 ATM Deposit Processing Module, DialogWeb, "NCR's ATM Captures Images at the Point of Deposit. (NCR Corp.'s New Automated Teller Machine)", Financial Services Report, vol. 10, No. 2, p. 8(1), 2 pages (Jan. 20, 1993).
Vector: Miscellaneous meeting notes and communications between Cummins Allison Corp. and Vector Co. Ltd regarding Vector imager, 65 pages (Apr. 1, 1996 to Jun. 15, 1997).
Pargh, Andy, "Vending Machines Dispense New Tricks It's a Breeze. Just Drop on your Money and Create a Card, Buy a Ticket or Even Pose for a Photo on the Moon ," Orlando Sentinel, 2 pages (Nov. 1, 1993).
Visa: Chargeback Management Guidelines for Visa Merchants, 30 pages (© 2011).
ATM Network, Owners Manual, Hyosung 1500; ATM network service department, 172 pages.

* cited by examiner

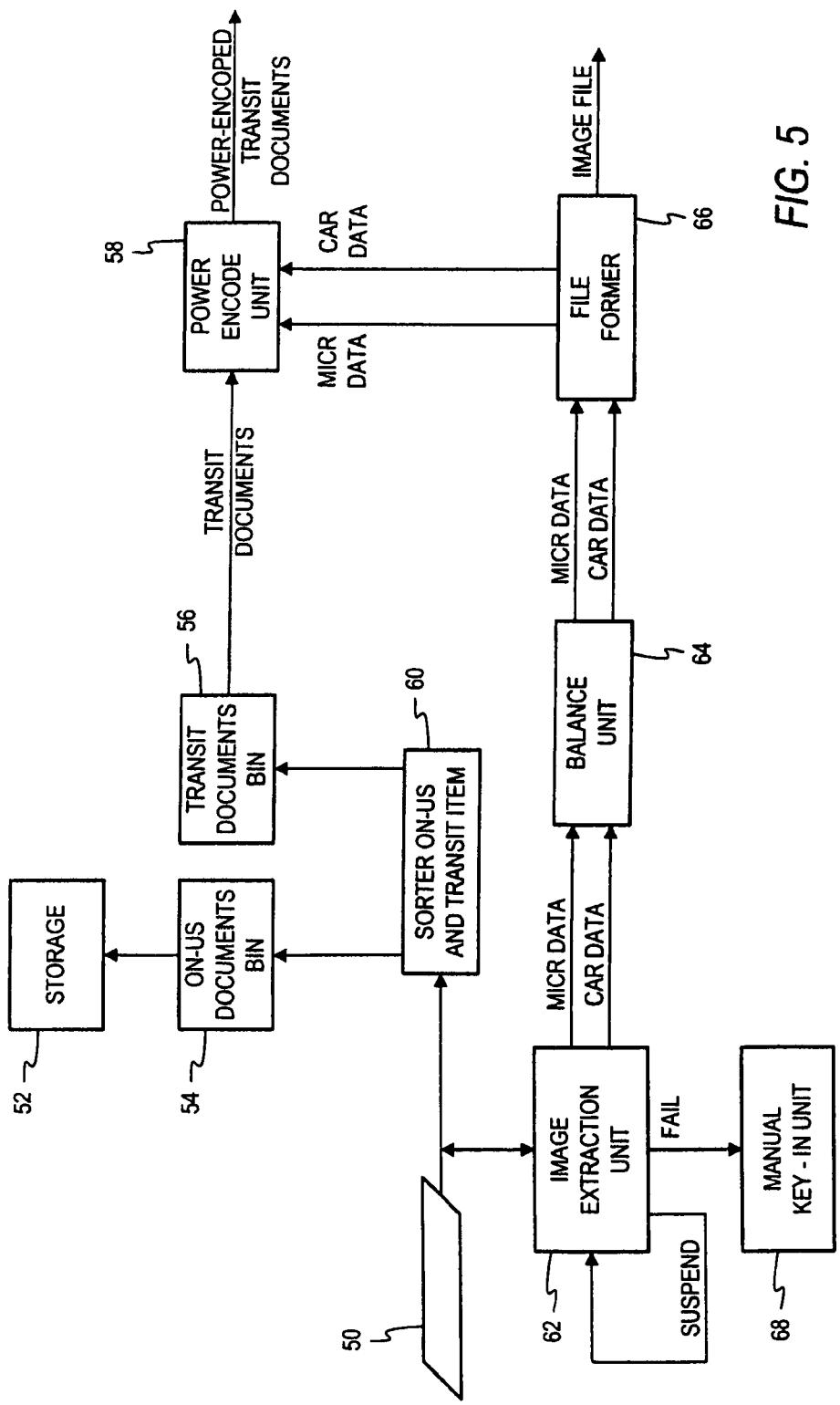

DOCUMENT PROCESSING SYSTEM

RELATED APPLICATIONS

This application is a continuation of pending U.S. application Ser. No. 12/177,702 filed Jul. 22, 2008, which is a continuation of U.S. application Ser. No. 12/025,661, filed Feb. 4, 2008, now issued as U.S. Pat. No. 7,542,598, which is a continuation of U.S. application Ser. No. 11/726,827, filed on Mar. 23, 2007, now issued as U.S. Pat. No. 7,391,897, which is a continuation of Ser. No. 11/082,573, filed Mar. 16, 2005, now issued as U.S. Pat. No. 7,197,173, which is a continuation of U.S. application Ser. No. 10/042,675, filed Jan. 9, 2002, now issued as U.S. Pat. No. 6,996,263, which is a continuation of U.S. application Ser. No. 08/814,978, filed Mar. 11, 1997, now issued as U.S. Pat. No. 6,363,164, which is a complete application claiming the benefit of U.S. Application No. 60/031,604, filed Nov. 27, 1996; U.S. application Ser. No. 12/025,661, filed Feb. 4, 2008, is also a continuation of U.S. application Ser. No. 10/393,867, filed Mar. 20, 2003, now issued as U.S. Pat. No. 7,349,566, which is a divisional of U.S. application Ser. No. 09/059,813, filed Apr. 14, 1998, now issued as U.S. Pat. No. 6,661,910, which is a complete application claiming the benefit of U.S. Application Nos. 60/043,516, filed Apr. 14, 1997, and 60/053,606, filed Jul. 22, 1997; the disclosures of each of the foregoing applications are hereby incorporated by reference herein in their entireties.

FIELD OF INVENTION

The present invention relates to check processing systems and, more particularly, to check processing systems which receive a check, image the check, transmit the check image to an accounting system and adjust an account associated with the check.

SUMMARY OF THE INVENTION

An embodiment of the present invention is a system for processing checks comprising an image processing device that receives a paper check, scans the received paper check to create a check image of at least one side of the paper check and obtains check information relating to the scanned paper check. A communications link is provided over which the check image and obtained check information is communicated. An accounting system connected to the communications link is operable to update a financial account associated with the paper check in response to the obtained and communicated check information.

Another embodiment of the invention is a check processing network comprising a plurality of check imaging devices, each such device receiving paper checks, scanning the received paper checks to create check images of at least one side of the paper checks and obtaining check information relating to the scanned paper checks. A financial institution accounting system operates to receive the check images and update financial accounts associated with the paper checks in response to the obtained check information. A data communications network interconnects the plurality of check imaging devices and the financial institution accounting system.

Another embodiment is a method for processing checks comprising scanning, at a first location, a paper check to create an electronic check image, truncating further processing of the paper check after scanning, obtaining information relating to the scanned paper check; electronically transmitting the electronic image and obtained check information to a second location; and reconciling at least one account associated with the paper check based on the electronically transmitted check information.

BRIEF DESCRIPTION OF THE DRAWINGS

FIG. 5 is a block diagram of the remote capture unit.

DETAILED DESCRIPTION OF THE PREFERRED EMBODIMENT

By "documents" it is meant to include checks, deposit slips, payment documents, savings withdrawal tickets, check deposit slips, savings deposit slips, and all other documents utilized as a proof of deposit at financial institutions. It is also meant by the term "documents" to include accounting invoices, debit forms, and account transfer forms.

By "accounting system" or "outside accounting system," it is meant to include the hardware and software associated with accessing, maintaining, tracking, and updating savings accounts, checking accounts, credit card accounts, business and commercial loans, consumer payments, and all other similar accounts at locations remotely located from the full image scanners. The term includes three broad types of systems: systems where deposits are made; systems where withdrawals are made; and systems where both deposits and withdrawals are made. Although the accounting system described herein is described as being employed at a financial institution such as a bank, it will be understood that any business, public or private institution, or individual can employ an outside accounting system to process transactions. By "financial institution," it is meant to include savings and loans, investment houses, and all other types of financial institutions whether private, public, or government. The following description is in terms of banks but it also includes all financial institutions as well.

Figure 1:
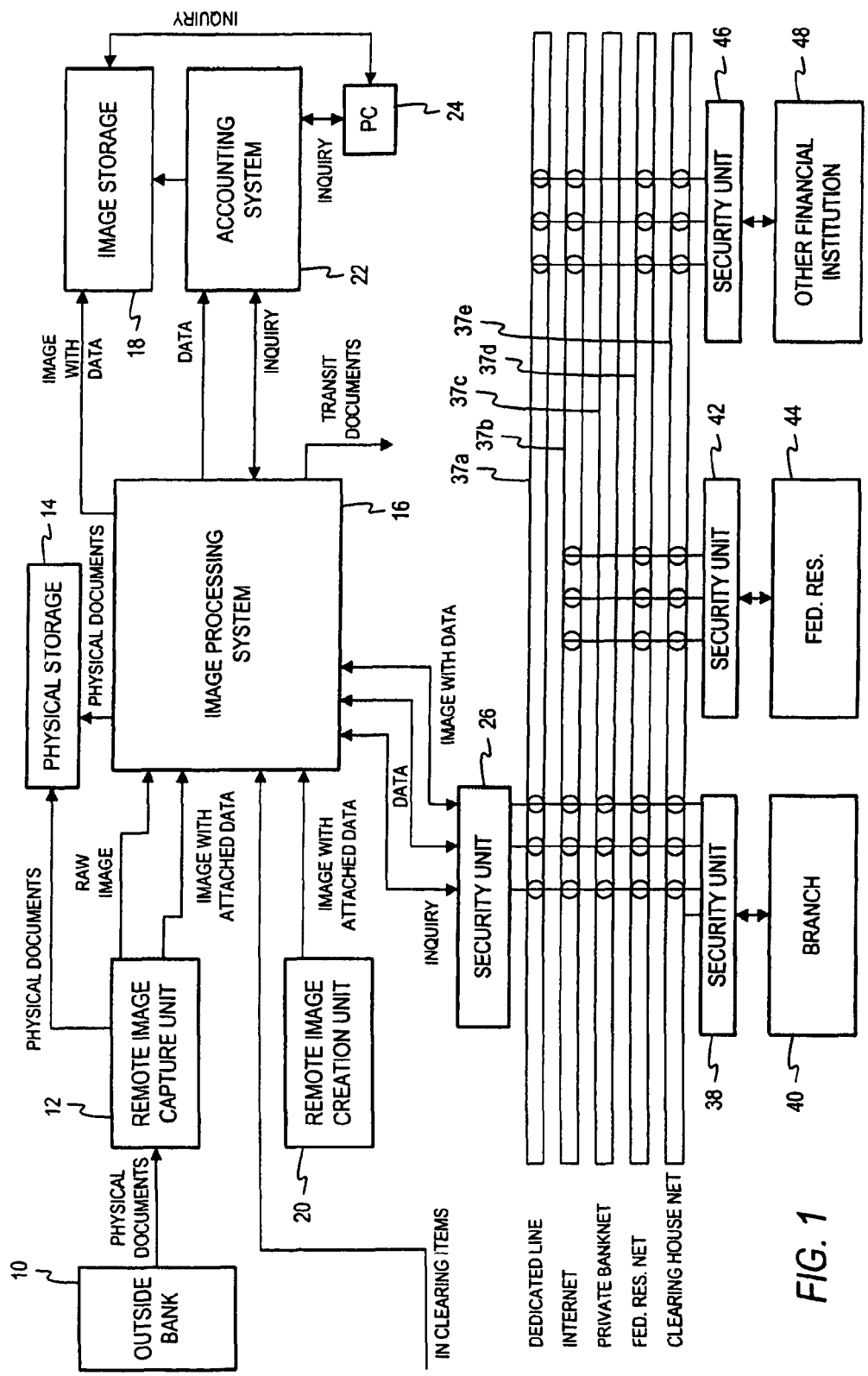
FIG. 1 is a block diagram of an image processing network.

Referring now to an image processing network as illustrated in FIG. 1, documents are scanned at a remote image capture unit 12. The remote image capture unit 12, as will be explained in greater detail below, is preferably a low-cost scanning unit that obtains an image of both sides of the document.

Figure 2:
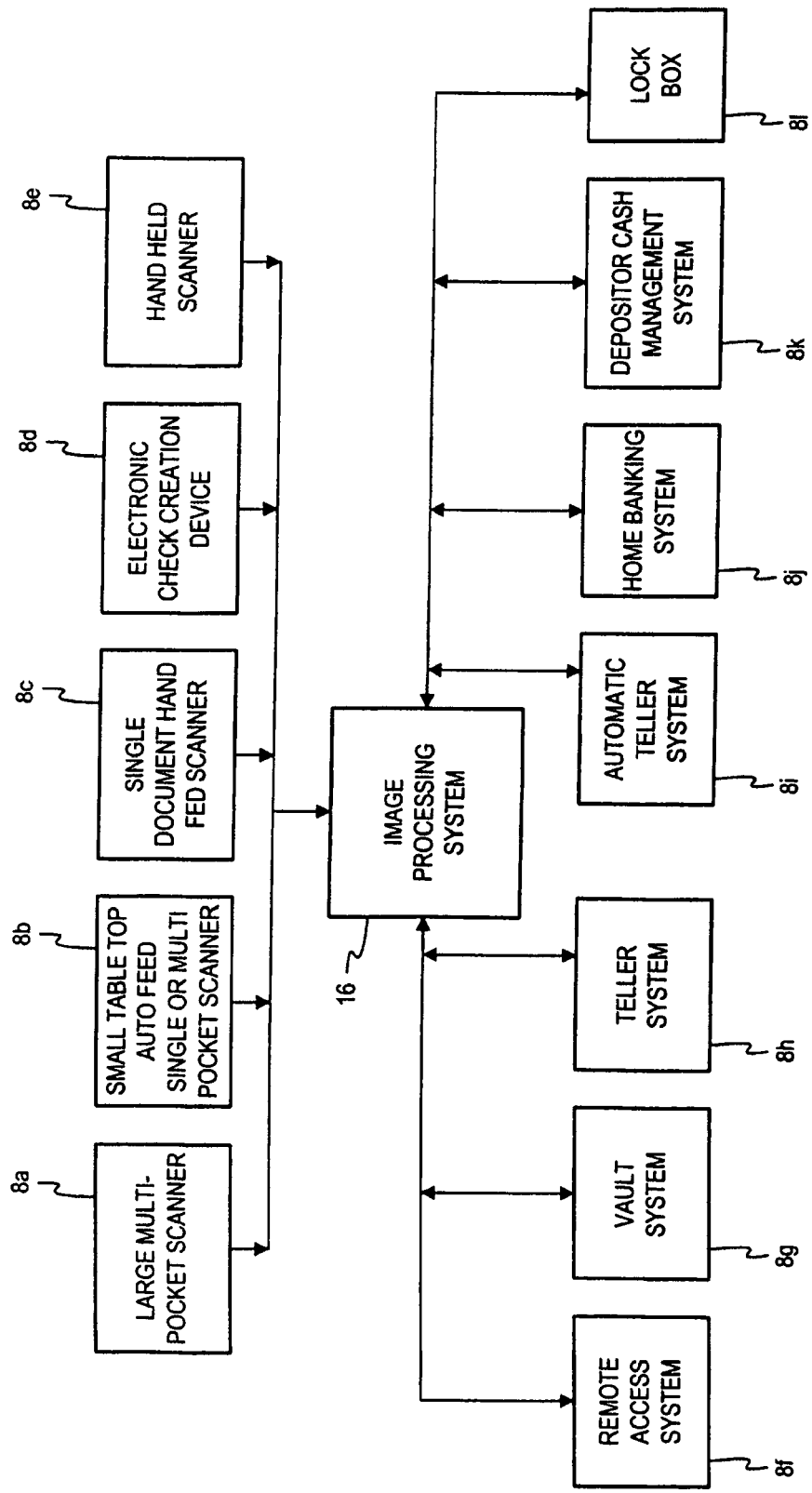
FIG. 2 is a block diagram of units which comprise the image processing network.

However, the remote image capture unit 12 may be a variety of machines including a large multi-pocket scanner, a small table-top scanner, a single document hand-fed scanner, and a hand-held scanner. For example, with reference to FIG. 2, the remote image capture unit 12 may be replaced by a remote image capture network 7 which comprises a plurality of remote image capture units.

The remote image capture network 7 includes a large multi-pocket scanner 8a. Using image sensors, the large multi-pocket scanner 8a captures images of one or both sides of documents, converts the images to digital signals, and sends these signals to be processed either at other units (described below) within the remote image capture network 7 or at an image processing system 16.

The remote image capture network 7 further includes a small table-top scanner 8b. In contrast to the large multi-pocket scanner 8a, the small table-top scanning device 8b is compact and can be conveniently located in the corner of a room or on a table top.

Also, the remote image capture network 7 includes a single document hand-fed scanner 8c. The single document scanner 8c is preferably a compact device where the user feeds through documents one-at-a-time. The single document scanner 8c has the advantage of being less expensive to purchase than other scanning devices.

The remote image capture network 7 also includes an electronic document creation device 8d. The electronic document creation device 8d comprises hardware and software which automatically creates an image of a document, for example, a check. The document creation device also preferably contains a specialized printer that is capable of printing documents which utilize special paper or ink, for example, checks.

Additionally, the remote image creation network 7 also includes a hand-held scanner 8e. The hand-held scanner 8e comprises a wand with which a user scans a document by moving a hand-held wand across the document. The wand is electrically coupled to a personal computer which has the necessary software to obtain and process the scanned image.

The above devices 8a-8e can be located as stand-alone units or as one component in all types of teller systems such as a teller system 8h at a window, in a vault system 8g, an automatic teller machine (ATM) 8i, a home banking system 8j, a depositor cash management system 8k or a night teller (not shown), or a lock box 8l. Additionally, they may be connected as a local area network (LAN), metropolitan area network (MAN), or wide area network (WAN).

The above devices are included as part of the vault system 8g. The vault system 8g includes hardware and software which processes the amount and type of currency, documents, or coin entering or leaving a vault. The vault system includes any of the devices described above such as the large pocket scanner module, a table-top scanning device, a single document scanner, an electronic document creation device, or a hand-held scanner.

The above devices are also included as part of the teller system 8h. The teller system 8h processes documents, coin, and currency at the teller window and maintains a record of all types of documents, currency and coin transactions at the teller window. The teller system may include any of the modules described above such as a table-top scanning device, a single document scanner, an electronic image document creation device, or a hand-held scanner. The teller system also has a video monitor to view images of documents or currency obtained anywhere in the image processing network or at the teller window.

The above image processing devices may be included in an automated teller machine (ATM) 8i. The ATM 8i processes all types of deposits involving all types of documents, currency, and types of coin in real-time from remote accounting systems and obtains full images of each document and all currency processed. The ATM 8i can also accept and transfer funds to all types of magnetic media such as smart cards. The ATM 8i also has a video monitor to view images of documents or currency obtained anywhere in the image processing network.

The above devices are also connected as part of a home banking system 8j. The home banking system 8j comprises hardware and software that allows a customer to check account balances, obtain images of deposited documents, and create images of documents. The home banking system 8j may include any of the other modules described above such as a single document scanner, an electronic document creation device, or a hand-held scanner. The home banking system 8j also has a video monitor to view images of documents obtained anywhere in the image processing network.

The devices mentioned above are further connected as part of a depositor cash management system 8k. The depositor cash management system 8k may include devices in one location or at several locations. The depositor cash management system 8k includes hardware and software to obtain images of documents, process these images, obtain transaction information, and perform any other functions associated with an accounting system. The depositor cash management system 8k may include any of the other modules described above such as the large multi-pocket scanner module, a table-top scanning device, a single document scanner, an electronic document creation device, or a hand-held scanner. The depositor cash management system 8k also has a video monitor or monitors to view images of documents obtained anywhere in the image processing network.

With reference again to FIG. 1, one function provided within the network is proof-of-deposit processing. Proof-of-deposit processing ensures that for a given transaction, debits equal credits. As described below, POD processing, CAR/LAR processing, or any other type of processing can occur at the remote unit or at a central location. Thus, images can be transported from any point in the network (including a central location) and processed at any other location in the network.

Shortly after the images are captured by the remote capture unit 12, they are transmitted to the proof of deposit area (within that unit or at a central location). It is important that the transaction be proved shortly after it occurs if the remote capture unit is at the teller window, automatic teller machine or depositor site. Tellers or a customer's clerical staff have access to all the images for the transactions handled that day and can correct any errors occurring that same day.

The remote capture unit 12 preferably contains hardware and software to detect and process counterfeit documents. Each remote capture unit assembles a running total of non-counterfeit documents for a given transaction, allowing a customer to know when a counterfeit has been detected. Counterfeits are held and deducted from totals so customers can know about that immediately.

Remote scanners can be placed at various locations, for example teller windows. Checks and other document images will be captured by these remote image scanners. The images are forwarded to a central location where proof-of-deposit processing occurs. Additionally, the financial institution could choose to process the image immediately at the central location or the financial institution could store the images for a period of time in some kind of electronic reservoir for proof of depositing at a later time. Processing the images at a central location has the advantage of not slowing down service at the remote location. For example, central processing reduces lines and excessive waiting for bank customers.

Documents that cannot be read by the remote capture unit ("no-reads") will be returned to the depositor. Alternatively, the remote image capture device can accept the document and display the image for a bank employee to key in the amount. This could be done as the deposit is being entered into the automatic teller machine or later. The deposit does not have to be proved while the depositor is at the automatic teller machine or the teller window. Since all of the items entered are stored as images, an account can be adjusted later. Alternatively, the customer may be prompted to enter the missing data. In this case the image file may be tagged for later verification.

Documents whose images are captured at remote capture units located at large retail and commercial depositor's place of business will be processed as at a teller window. All items are sent to the bank, until all banks are able to receive images. They would be processed on check processing machines to separate the on-us items from transit items and to power encode the transit items.

It should be realized that the above imaging network can be used for all or part of a bank or financial institution's document processing needs. For example, some banks may choose to process only checks. Additionally, a bank might use this for on-us checks or for on-us checks of under $100. These checks would be scanned at the branch location or the ATM location. These low value checks would then be immediately destroyed because the bank could utilize the captured image. However, all on-us checks in excess of $100 and all transit checks would be handled under the current system. The bank will hold certain checks over a certain value for a longer period of time before destroying or returning the check. Thus, the present invention can be used in combination with current physical document processing.

Figure 3:
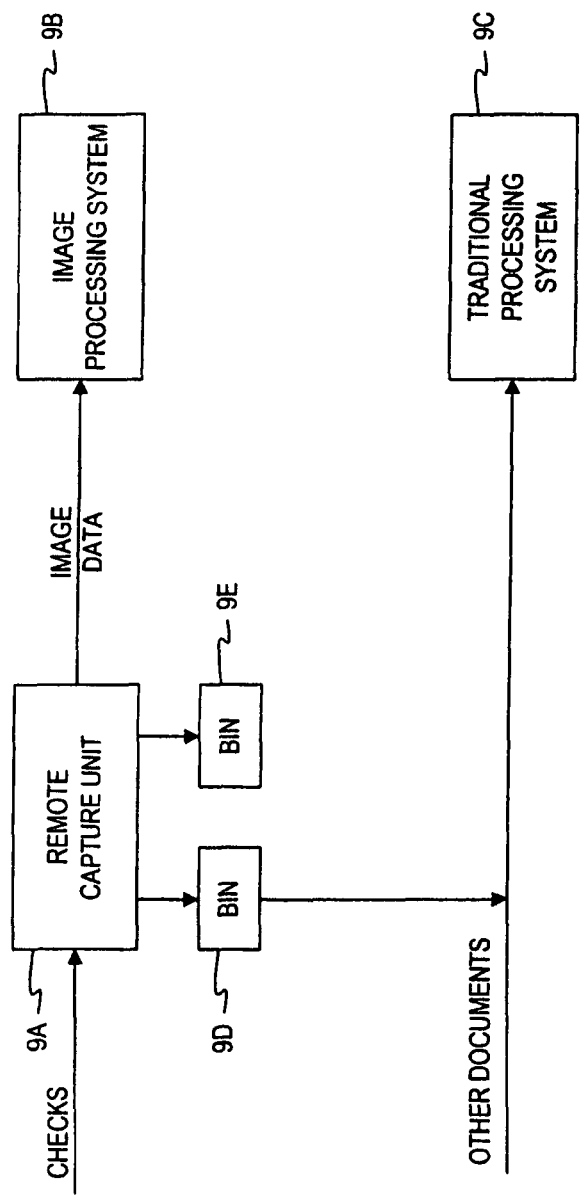
FIG. 3 is a block diagram of an image processing system used in combination with a traditional document processing system.

Referring now to FIG. 3, checks are fed through a remote capture unit 9a. The unit 9a operates like the remote capture unit 12 of FIG. 1 as described above and has plural output bins. The unit 9a scans each check and sorts the checks into the plural output bins based on whether the checks are going to be physically processed. As an example, the checks may be sorted based on determined check amount. For example, checks greater than $100 may be placed in a first bin 9d so that further physical processing of the checks can be made. All other checks are placed in a second bin 9e where they are later discarded (i.e., they are not further physically processed). The images of selected ones (perhaps based on bin sort) or all of the checks are sent to an image processing system 9b which operates as described below. The checks from the first bin 9d are physically transported to a traditional processing system 9c where they are processed using a traditional bank document processing system 9c. Other documents entering the system may be processed by the traditional processing system 9c.

The network of FIG. 1 can be configured to provide a combination of distributed and centralized image processing. That is, remote image capture units 12 may supply images to an image processing system 16 at a remote location (e.g., a bank branch) where image processing is accomplished. Additionally, central processing locations may exist where physical checks and/or images are processed as is known to those skilled in the art. As a specific example, a bank might have remote units located at various bank branches. At the same time, certain customers may continue to send their check images to a central location for processing. Additionally, certain customers may choose to send checks having a value over a predetermined amount, such as $100, to a central location for processing.

The remote image capture unit 12 may accept physical documents from a bank system 10 which does not process the images of documents. The documents are moved to the remote image capture unit 12 where they are processed.

The remote image capture unit 12 provides either "raw" image data or an image file to the image processing system 16. Raw image data is unformatted data that is sent as a series a binary digits. Raw image data is transmitted from remote image capture units which lack the capability to process the raw data into an image file. The raw data is sent to the image processing system 16 where processing is accomplished, as described below.

The image processing system 16 also accepts image files from a remote image creation device 20. The remote image creation device 20 creates images of documents. For example, the remote image creation device 20 can create the image of a check. The remote image creation units use software to create the image and prompt the user for information to complete the image such as the transaction amount and the payee.

The image processing system 16 also accepts inclearing items. The inclearing image processing area accepts images in the format of the file described above. The inclearing images comprise image files associated with "on-us" documents or, in addition, physical documents. In this way, the image processing system 16 is able to process both image files and physical documents. Additionally, if needed because other financial institutions can not process image files, transit documents are sent out of the image processing system 16 to other financial institutions.

The remote image capture unit 12, after processing the documents performs a sort, separates documents and sends some documents to physical storage 14. For example, if used by a bank, the remote image capture unit 12 will separate documents drawn on the financial institution ("on-us" documents) from documents drawn on other financial institutions ("transit" documents). In an alternate embodiment the documents are not separated but are destroyed.

The image processing system 16 accepts both raw image data and image files. As will be explained in greater detail below, the image processing system 16 sorts document image files into transit and on-us image files, performs proof-of-depositing functions, forms cash letters for transmission, and routes the out-going transit image files. Additionally, it may power-encode physical documents (if needed) and acts as a conduit for inquiries throughout the system.

The image processing system 16 sends image files to an image storage device 18 where they are stored. The image storage device 18 may be an optical storage device or a magnetic storage device, as is known in the art.

The storage device allows the system's owner (i.e., a bank) to make a full record of deposits. In other words, when the customer deposits the document, a full image picture of the front and back side of the document is deposited. This is advantageous at the teller window, and, in particular, when the remote capture device is an ATM which accepts bulk deposits. Therefore, if a dispute arises at a later date relative as to what was deposited into the ATM, there will be a full image record of the complete deposit. The customer can then review each document deposited. Therefore, the bank and customer can easily re-reconcile the deposit based upon the image record.

The image processing system 16 sends the data portion of the image file to an accounting system 22. As described above, the accounting system 22 includes the hardware and software associated with accessing, maintaining, tracking, and updating savings accounts, checking accounts, credit card accounts, business and commercial loans, consumer payments, and all other similar accounts at locations remotely located from the image processing system 16.

A personal computer (PC) 24 is coupled to the accounting system 22 and the image storage 18. The personal computer 24 contains software allowing the operator to make inquiries about a particular document. The inquiry comprises data representing the document identification number and the location within the network where the document is stored. The inquiry can also be routed through the accounting system 22 and the image processing system 16 and then through a security unit 26 onto a dedicated line 37*a*, an internet line 37*b*, a private banknet line 37*c*, a federal reserve network line 37*d* or a clearing house network line 37*e*. From these lines, the inquiry is routed over the particular network to the destination, as is known in the art. When received at the destination, the request is routed to particular hardware or software where the inquiry is serviced, that is, the destination responds to the request by answering that the entry was not found, that the user does not have access rights to the information, or with the image file (with a marking indicating that it was from an inquiry). Then, if the query is successful, the image data file is routed back (with the inquiry mark). It goes through security 26 and returns to the image processing system 16. Since it is marked, it is routed to the outside accounting system 22 and to the personal computer 24. At the personal computer 24, the contents of the image file are displayed.

The image processing system 16 transmits and receives inquiries, the data portion of the image file, and image files through the security unit 26. From the security unit 26, the inquiries, data and image files can traverse the dedicated line 37*a*, internet line 37*b*, private banknet line 37*c*, federal reserve network line 37*d* and clearing house network line 37*e*. All of these lines are connected through security units 38, 42, and 46 to other bank branches 40, the federal reserve system 44, and other financial institution processing 48.

Figure 4A:
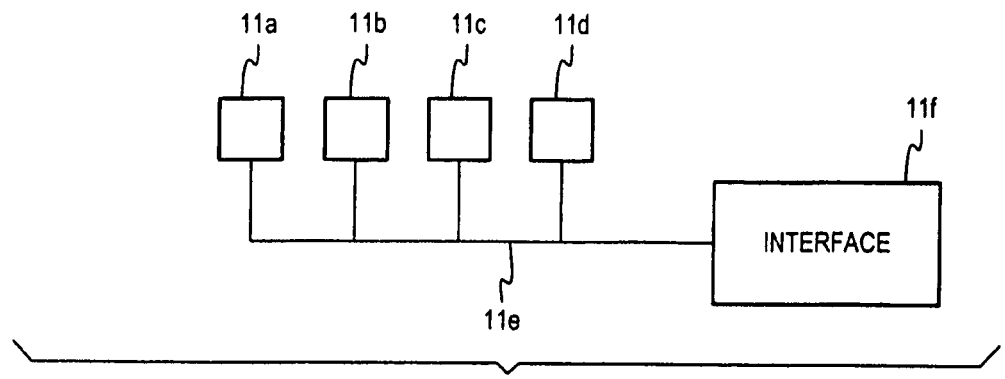
FIGS. 4a-4c show topologies for the interconnection of remote capture devices.

The devices on the remote image processing network are preferably connected to form a LAN. The physical layout or topology of the LAN can vary. For example, as illustrated in FIG. 4*a*, a series of remote units 11*a*, 11*b*, 11*c*, and 11*d* are connected to common bus 11*e*. Bus 11*e* connects the common bus to an interface 11*f* which accesses other networks. The "remote units" may include any combination of large multi-pocket scanners, small table top scanners, single document scanners, electronic document creation devices, hand-held scanners, vault systems, teller systems, ATMs, home banking systems, or retail cash management systems. The bus-based network is inexpensive, reliable, and requires the least amount of cable for any LAN topology.

Figure 4B:
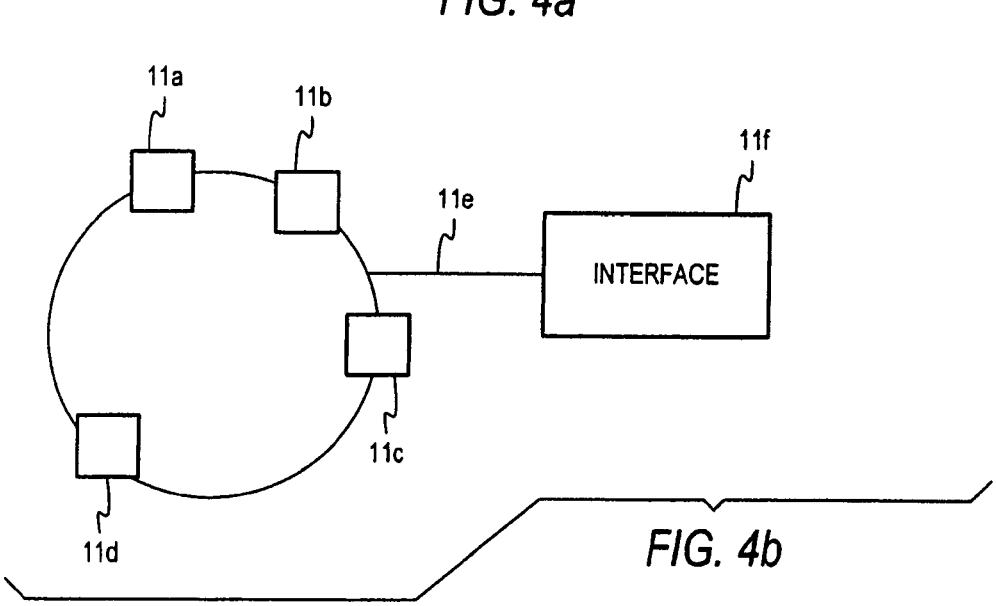

A LAN using a ring topology is illustrated in FIG. 4*b*. Remote units 11*a*, 11*b*, 11*c*, and 11*d* retransmit information to adjacent units using point-to-point links. The units communicate with other networks through an interface 11*f*. Although more expensive than the bus topology, the ring topology lends itself to being able to transmit over greater distances.

Figure 4C:
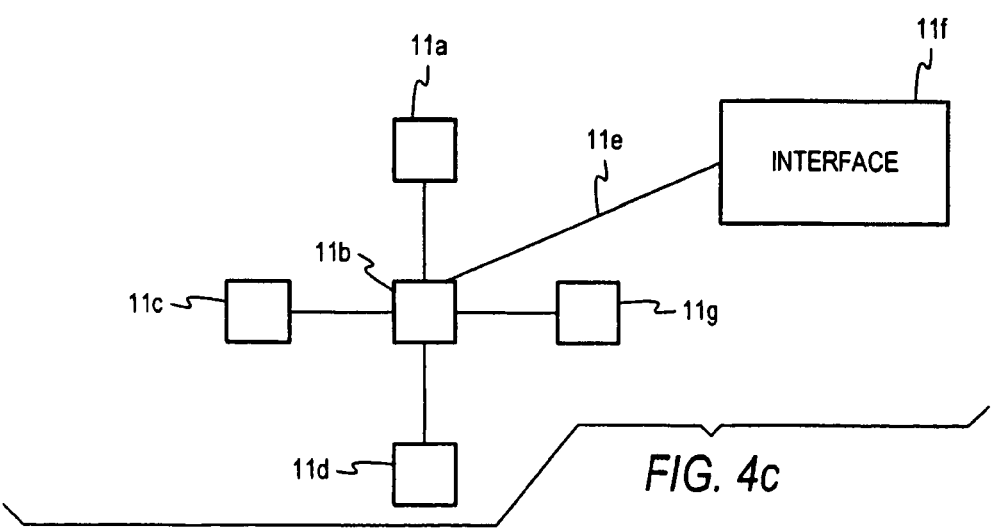

A LAN using a star topology is illustrated in FIG. 4*c* where a central remote unit 11*b* is connected to all other remote units 11*a*, 11*c*, 11*d*, and 11*g*. The central remote unit 11*b* communicates to other networks through an interface 11*f*. An advantage of the star topology is enhanced network management. Because all traffic passes the central unit 58, traffic monitoring is simple and detailed network reports are easy to produce. Enhanced security is inherently a part of this type of topology since the central unit can keep tables of user access rights as well as acceptable passwords. Also, the network can easily control who logs onto any remote device present on the network.

It will be understood by those skilled in the art that any combination of the above topologies can be used to construct the network. Thus, any of the units may be, themselves, networks of any topology.

Referring now to FIG. 5, with respect to the image capture unit 12, a document 50 is scanned by an image extraction unit 62. Preferably two heads are used to obtain full video images of both sides of the documents. However, the unit can have any number of heads and scan only one side of the document. Additionally, the document can be scanned in either the wide or the narrow direction. The image extraction unit 62 extracts portions of the image of the document for future processing. For example, in the case of a check, the image extraction unit 62 extracts MICR data, courtesy amount (CAR) data, and legal amount field (LAR) data. The image extraction unit 62 may also be configured to extract other data in the case of currency or other types of documents. The image extraction unit 62 sends a "suspend" signal to deactivate itself in the case of overflow of documents. The suspend signal starts a timer which, upon time-out, allows the image extraction unit 62 to resume operations. However, if the overflow condition still exists, then another suspend signal will deactivate the image extraction unit 62.

When the image extraction unit 62 fails to identify the required data, then a "fail" signal is sent to a manual key unit 68. An operator at the manual key unit 68 is alerted and then views the image of the document on a video terminal (not shown) and enters the missing data at the manual key unit 68.

The image extraction unit 62 sends the MICR data, CAR data, and LAR data to a balance unit 64. The purpose of the balancing unit 64 is to ensure that the amount recorded as the total of a transaction matches the individual amounts recorded. For example, a deposit may comprise ten checks. The purpose of the balance unit 64 is to ensure that the amounts recorded on a deposit slip as the total matches the total deposited as recorded by the extraction unit 62. The balance unit 64 also creates images of cash-in slips which are used to indicate the number of bills processed in a transaction. The cash-in and cash-out slips are created automatically as images and indicate the number of dollar bills handled both in and out which are printed on these receipts. The bank stores images of all documents and currency processed in every transaction. Thus, processing errors are easily detectable. Also, the stored images facilitate convincing the depositor that the transaction, as corrected by the bank, is correct.

The MICR, CAR, and LAR data is sent to the form image file unit 66 where an image file is formed. As mentioned above, the image file comprises an image portion and a data portion. The two portions are tied together by pointers which indicate the location and identity of the other portion. The image file is then sent to the image processing system.

In some networks, it will be necessary to sort "on-us" items and transit items, then send out (physically) the transit items. A sorter 60 sorts on-us and transit items. The on-us documents are placed in an on-us document bin 54 while the transit documents are placed in a transit bin 56. Alternately, any number of bins may be used. For example, the on-us items may be sorted into on-us bins for checks, currency, coupons or other types of documents. The user takes the physical documents from the bin 54 and places them in physical storage area 52. The storage area may be near the sorting unit or may be housed in a separate facility. The transit documents are transported via a transport mechanism to a power-encoder 58 where the MICR, CAR, and LAR data are power-encoded onto the document, as is known in the art. The power-encoded document is then transported to the financial institution required. It should be noted that in an alternate embodiment, the system of FIG. 5 would be paperless. In this case, the document transport mechanism 51 simply discards the documents; units 56 and 58 are omitted. In yet another embodiment the system would process some paper documents and unit 56 would be omitted.

Figure 6:
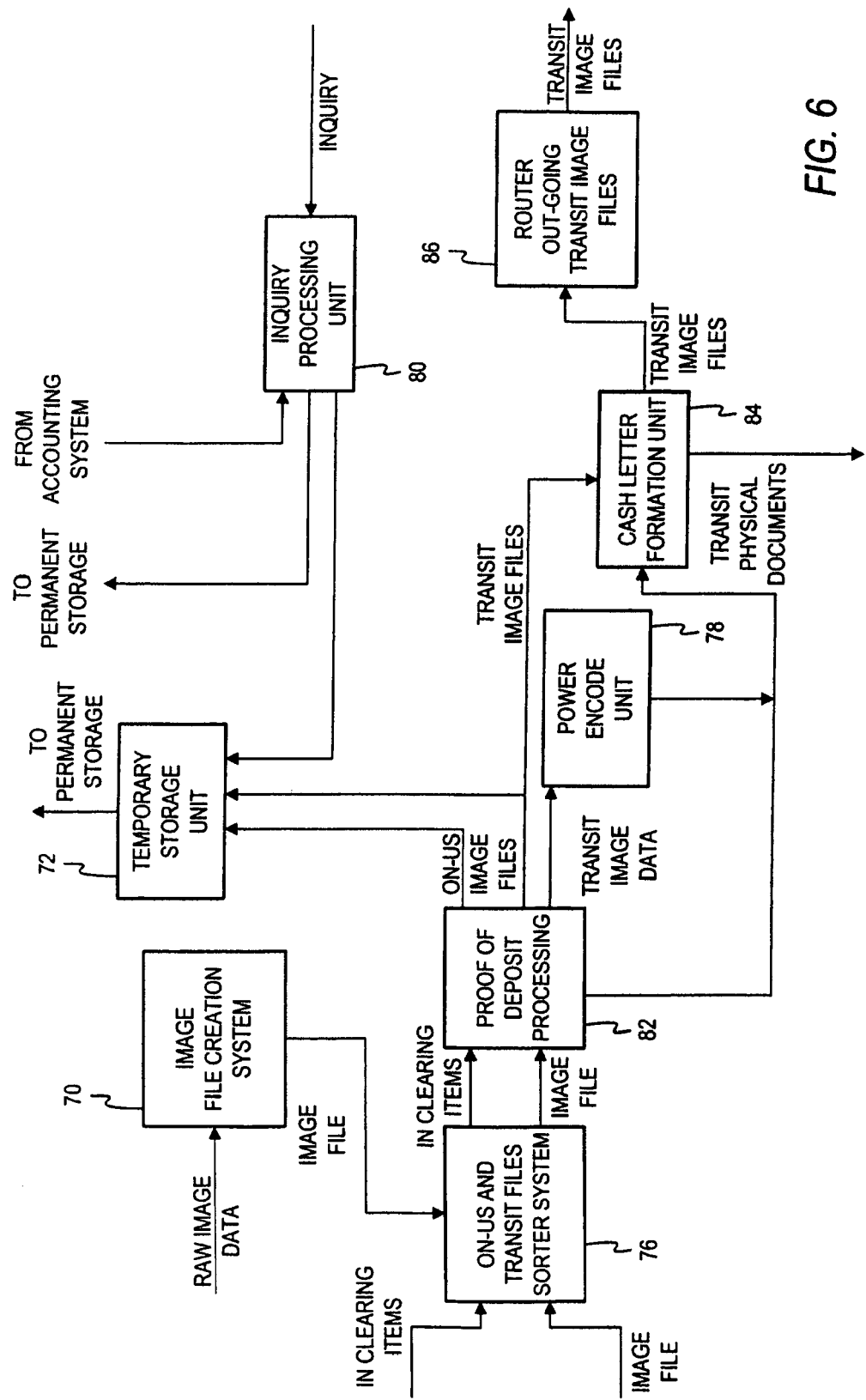
FIG. 6 is a block diagram of the image processing system.

Turning now to FIG. 6, the image processing system 16 comprises an image file creation system 70 which accepts raw image data. The image data is processed as described with respect to the remote image capture unit above. This image file creation system 70 is located at the image processing system when the remote image capture unit 16 lacks the capability for processing a document image.

An on-us and transit file sorter system 76 sorts on-us and transit image files and physical documents. Both the on-us and transit image files are sent to a temporary storage unit 72 which stores the image files for a short period of time, for example, until the end of the day. At the end of that time period, the temporary storage transmits these files to a permanent storage 18. The transit image files are sent to a cash letter formation unit 84. The physical transit items are encoded by a power encode unit 78. The on-us physical items are imaged by the system 76 and their image files processed as described above. The sorter system 76 sends both inclearing items and image files to a proof-of-deposit processing system 82. Alternatively, MICR encode units may be located at remote units throughout the system.

The proof-of-deposit processing unit 82 determines whether documents and images accepted are the same as the declared deposited amount. In other words, the unit determines that the documents declared as input are going out as an output. The proof-of-deposit processing unit 82 accepts both physical items (inclearing items including both on-us and transit items) and image items. The image items include image files from other banks, image files from remote capture units, and image files from the image file creation system 70. Of course, in an image-only system the functionality of processing physical documents would not be present.

The data portion of the transit image files is sent to a power-encode unit 78 where, if needed, the information is placed on the physical document sent out as a transit item from a cash letter formation unit 84. The power encode unit 78 can be omitted in a paperless network.

The transit image file and any transit documents are also sent to the cash letter formation unit 84 where the individual image files and documents having the same destination are bundled together into a single packet of data or physical packets. Outgoing transit file router 86 then transmits the data to its correct destination. The router 86 adds data, as is known in the art, ensuring that the packet will reach its destination. In the case of physical documents, the documents are sent to the correct financial institution. Of course, in an entirely image-based network, the handling and processing of physical documents would be omitted.

A inquiry processor 80 accepts inquires. The inquiry processor determines whether the image file requested is in temporary storage 72. When found, the inquiry processor 80 determines whether access permission has been granted. If permission has been granted, the image file is sent over the correct lines to the output. The inquiry processor also receives inquiries from the accounting system and routes them over the inquiry line to the appropriate outside destination.

Reference is once again made to FIG. 1. Image files, the data portion of image file, and inquiries are transmitted to branches of the same bank 40, the federal reserve system 44, or to outside financial institutions 48. The data portion of the image file follows the traditional settlement path. That is, the data portion of the image file may first go to the federal reserve if two banks do not have a direct account. There, the moneys are transferred by an accounting system as described above. Alternately, banks may have special accounts between each other. This usually occurs when the banks have a large volume of transactions. Then, the image data files are sent to the banks directly.

Thus, financial institutions and the federal reserve system transfer image files, the data portion of image files, and inquiries over dedicated lines 37*a*, which are connected directly between financial institutions. The above information can also be transmitted over the internet 37*b* as is known in the art. Also, the above data can be transmitted over a private bank-net which provides connections between the various branches of a bank. Also, the above information can be transmitted over a federal reserve network line 37*d* to banks in the federal reserve system. Finally, the above data can be transmitted over a clearing house network line 37*e* to a financial clearing house.

As an alternative, or in addition to the communication links described above, the image data may be stored on CD ROM (or any other type of magnetic or optical media) and physically transported to any point in the system. In this way, data can also be viewed at points not coupled to the network.

It will accordingly be recognized that the image processing network described herein processes several types of physical and electronic data units.

First, it processes physical documents (for example, checks).

Second, it processes image files. The image file comprises three portions. A first portion contains binary encoded data representing the images of both sides of the document. Alternatively, this first portion may contain only a portion or portions of the document. The second portion of the image file contains data extracted from the images of the document. It is an important feature of the invention that all information in the second portion is obtained from the images. For example, MICR data is obtained from the image of the document rather than alternate extraction techniques such as magnetic reading. In the case of a check, the second portion includes the MICR data, such as the amount of the check and the bank drawn. A third portion contains a unique identification code or tag associated with the document. For example, if the document is currency, the unique identifier may be a serial number, seal, plate number, or customer number.

For those documents where data fields are unreadable, the image can be transmitted to a central location where an operator would view the image and key in the amount. Also, the operator keys in any non-readable MICR or CAR/LAR data. In the context of a bank imaging network, the bank would choose between simply sending forward the captured image for final settlement or waiting for the physical document to arrive from the remote location. If the physical document arrives at the central location, there would be a benefit from the imaging. The amount field will already have been entered. Therefore, when the checks are transported through the centralized check processing system, the on-us checks immediately have the amount field MICR encoded. This represents a savings in time and labor over current systems which require one pass for MICR encoding and one for sorting checks into various output bins.

Alternatively, the customer may be prompted to enter unreadable data. Allowing a customer to enter missing data may be allowable for only selected customers of the financial institution. Alternatively, all customers may be allowed this option and the image file tagged for later verification of the amount.

Similarly, being able to MICR encode on the first pass on transit checks reduces the number of passes through the scanner. Therefore, the productivity and efficiency of the proof-of-deposit processing are increased regardless of which methods are used (i.e., actual handling of physical documents or only image processing).

The image file data portion also includes the identities of banks where the image file has been processed. Both the data portion and the image portion have tags uniquely identifying the document, and pointers to where the other portion is located. The two portions are not necessarily physically contiguous. A security code is attached in both portions so that the item can transit between banks or depositors and the bank.

Third, it manipulates the data portion of the image file. As explained, the entire image file need not be sent to all destinations in the network.

Finally, it handles inquiries as to the images. The inquiry is data representing the document number and will be correctly routed through the network until the document is found or permission to access the document is denied. Inquires are used by bank personnel or customers to view the image file of the document.

Figure 7:
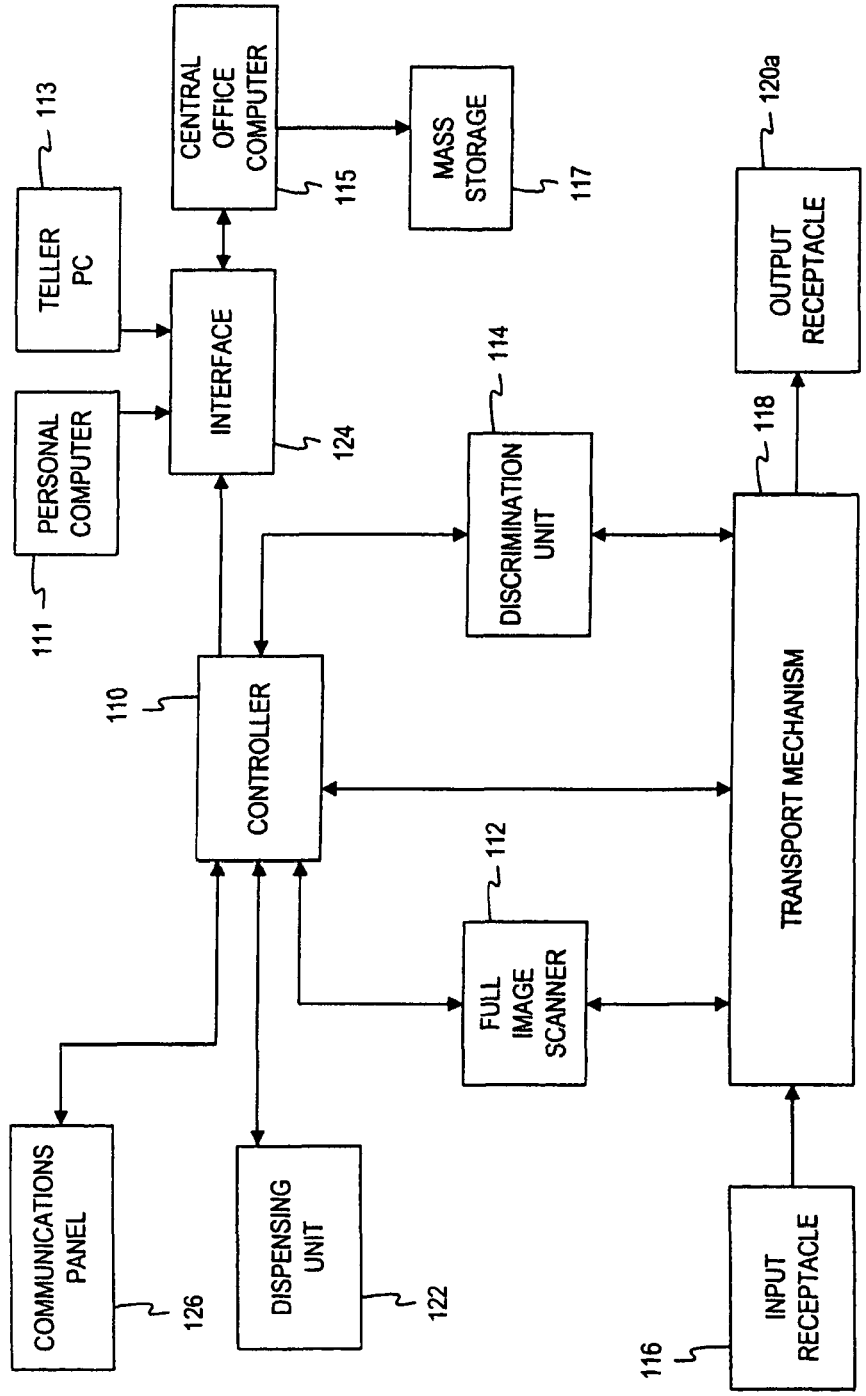
FIG. 7 is a block diagram of a document processing system with a single output bin.

Reference is now made to FIG. 7 for a description of another embodiment for the network. A user deposits documents into an input receptacle 116. A transport mechanism 118 transports the documents from the input receptacle 116 past an image scanner 112, as the documents are illuminated by a light (not shown). The image scanner 112 scans an image (for example, the full image) of the document, recognizes certain fields within the document, and processes information contained within these fields in the document. For example, the image scanner 112 may search for a number field when processing the document, determine the number once the field is located, and store the number for later use by the system. The system may also be used to capture any document image for electronic document display, electronic document storage, electronic document transfer, electronic document recognition (such as check amount recognition) or any other processing function that can be performed using an electronic image.

Next, the transport mechanism 118 transports the document past a discrimination and authentication unit 114. The discrimination and authentication unit 114 authenticates the document. On documents such as checks, the system may capture information such as the check amount, account number, bank number, or check number. The discrimination and authentication unit 114 also directs the transport unit 118 to place the document in the output receptacle 120 as described below.

A dispensing unit 122 dispenses funds to a user. For example, when the user makes a deposit into an account, the system has the capability to return all or part of the deposit back to the user in the form of bills, coins, or other media via the dispensing unit 122. The amount of payback to the user may be supplemented by funds from other accounts, as well, as described below. The dispensing unit 122 is capable of accepting a variety of media including money orders, smart cards, and checks and may include separate units directed to accepting a particular type of media.

Figure 8A:
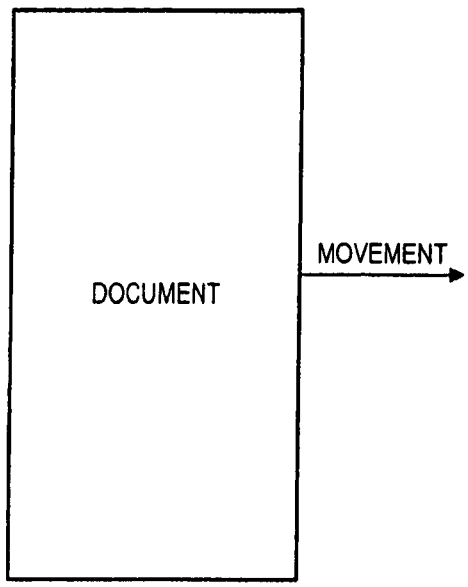
FIG. 8a is a view of a document being scanned by the full image scanner in the wide dimension.
Figure 8B:
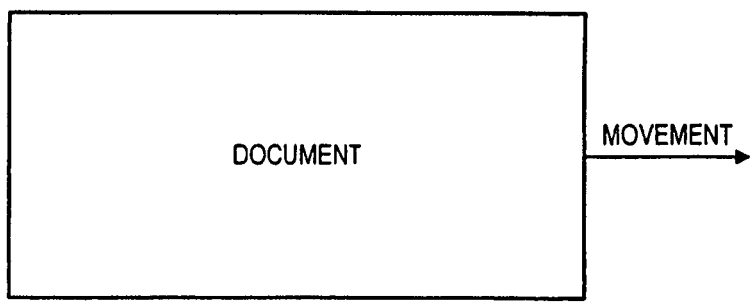
FIG. 8b is a view of a document being scanned by the full image scanner in the narrow dimension.

A controller 110 manages the operation of the system. The controller 110 directs the flow of documents from the input receptacle 116 through the transport mechanism 118, past the image scanner 112 and the discrimination and authentication unit 114, and into the output receptacle 120. The transport mechanism directs the documents through the system such that the documents are scanned either along their wide dimension as shown in FIG. 8a. Alternatively, the documents are passed through the system such that they are scanned along their narrow dimension as shown in FIG. 8b. The controller 110 also directs the dispensing unit 122 to dispense funds to the user and routes information from the full image scanner 112 and the discrimination and authentication unit 114 to an interface 124 which communicates with an outside accounting system or central office. The controller is also capable of directing information from the outside office through the interface and to a communications panel 126. Finally, the controller 110 selectively processes information from the image scanner 112 and the discrimination and authentication unit 114 for use by the system.

Several image scanners 112 can be interconnected to form a local area network (LAN). The individual image scanners 112 may be located at teller stations, in bank vaults, or at businesses, for example. In such a network, some or all image processing is accomplished at the image scanner and not at some centralized location. In other words, the processing functionality is "distributed" in such an arrangement. The individual LANs may have a different physical layouts or topologies. With reference once again to FIG. 4a, image scanners 112 may comprise units 11a-11d connected to common bus 11e. Bus 11e is coupled to interface 11f which communicates with an outside accounting system for performing the functions described herein. In FIG. 4b a LAN using a ring topology is illustrated. Image scanners 112 comprise units 11a-11d which retransmit information to adjacent scanners using point-to-point links. The scanners communicate with other networks through interface 11f. In FIG. 4c a LAN using a star topology is illustrated. A central image scanner 112 as unit 11b is connected to image scanners 112 as units 11a, 11c, 11d and 11g. The central full image scanner communicates to other networks through an interface 11f.

Figure 9:
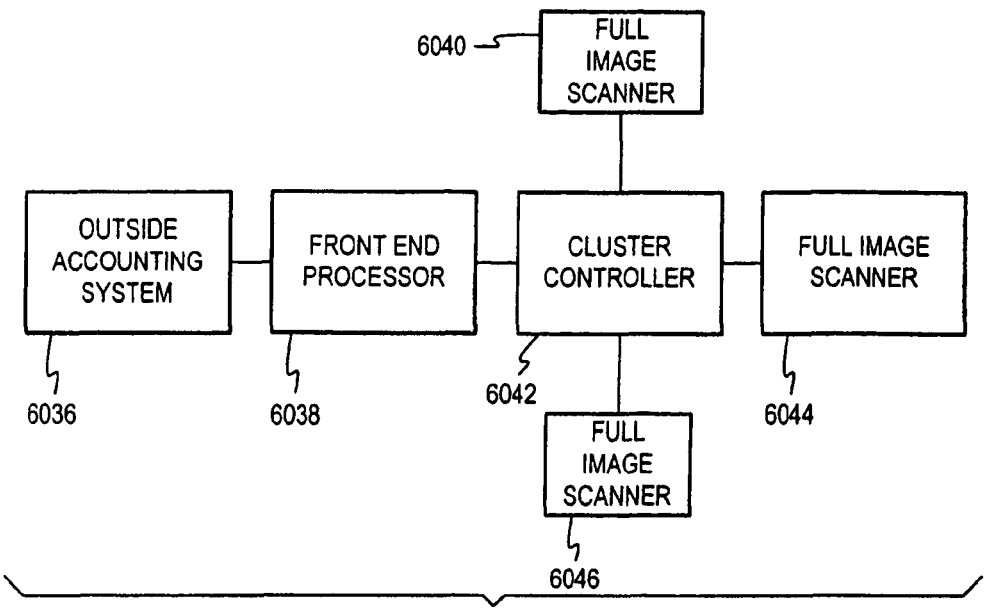
FIGS. 9-10 are a diagrams of networks of image scanners.

Referring now to FIG. 9, there is illustrated another image processing network embodiment. An outside accounting system 6036 communicates with front end processor (FEP) 6038. The FEP 6038 is a software programmable controller that relieves the outside accounting system 6036 of many networking and data communications tasks. The FEP polls devices, performs error checking and recovery, character code translation, and dynamic buffer control. The FEP also serves as a data concentrator concentrating several low speed transmissions into a steady, high-speed flow of data. Image scanners 6040, 6044, and 6046 (for example, scanners 112) communicate with the FEP 6038 (and the outside accounting system 6036) via cluster controller 6042. Cluster controller 6042 serves as an interface between the outside accounting system 6036 and the scanners 6040, 6044, and 6046. The image processing device 6036 has a master/slave relationship with the scanners 6040, 6044, and 6046 and polls, via FEP 6038, the devices and determines if they wish to communicate.

Figure 10:
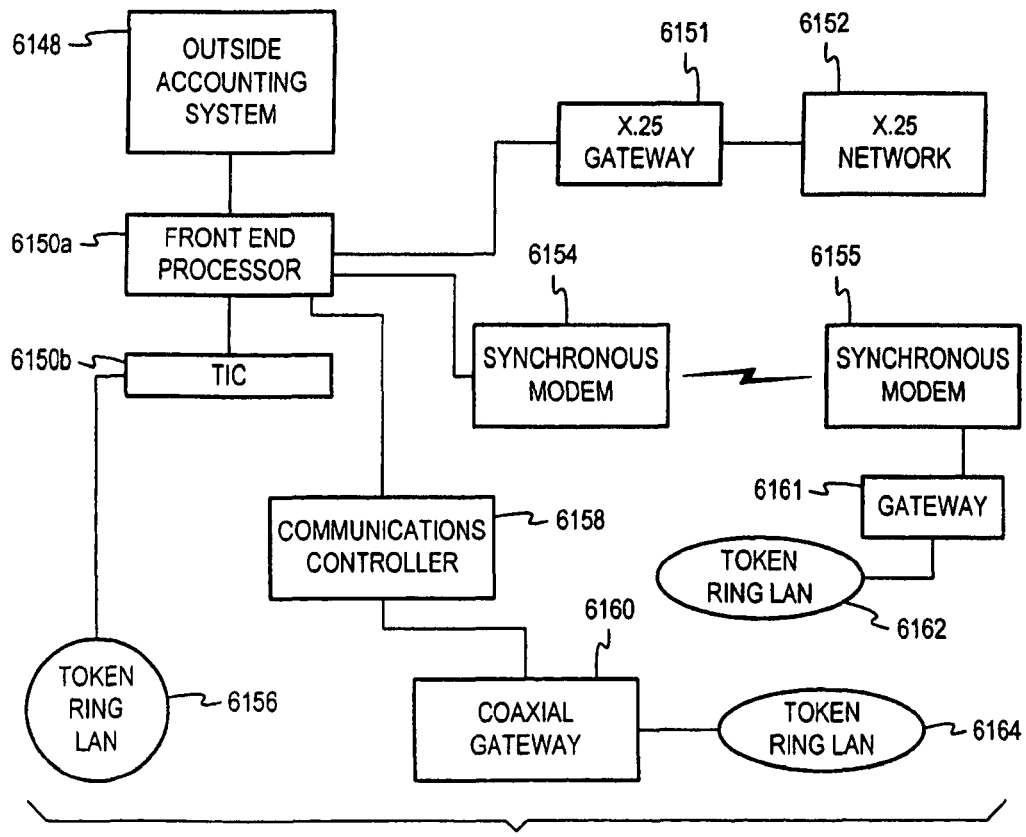

Another image processing network is described in connection with FIG. 10. In this network, gateways are used to connect networks which have different network architectures. Gateways use all seven layers of the OSI model and perform protocol conversion functions at the Application layer. An outside accounting system 6148 is coupled to FEP 6150a which is connected to a token-ring interface coupler (TIC) gateway 6150b. TIC gateway 6150b provides connections to token ring networks 6156, 6162, and 6164 which include other full image scanners.

The highest performance LAN gateway is the link between a token-ring network 6156 and the image processing device's FEP 6150*a* via the TIC gateway 6150*b*. The TIC 6150*b* permits a 4 mbps or 16 mbps connection depending upon the hardware used. The TIC 6150*b* is viewed by the host as a cluster controller; the outside accounting system polls the TIC 6150*b* which in turn polls any units on the token-ring network 6156.

The network also contains a remote LAN gateway which functions as a gateway to another token ring LAN 6162. For example, the gateway 6161 functions as a cluster controller and communicates with the FEP using IBM's SDLC protocol via synchronous modems 6154 and 6155 at both sites. The synchronous modems 6154 and 6155 can dial up the FEP at speeds up to 64 kbps.

Remote X.25 LANs (which use the X.25 packet switching protocol and contain full image scanners) can also communicate with the host via X.25 gateways. A gateway 6151 with an adapter card functions as a cluster controller and runs special gateway 6151 software that runs over a given protocol and communicates with the X.25 network. A local coaxial gateway 6160 is also provided which allows a workstation on the LAN to emulate a distributed function terminal (DFT) mode of processing.

It should be realized that the units connected to particular gateways are in no way limited to use with a particular gateway. In fact, the gateways and units can be interchanged and other types of equipment can be used to structure the network as is known to those skilled in the art.

Figure 11:
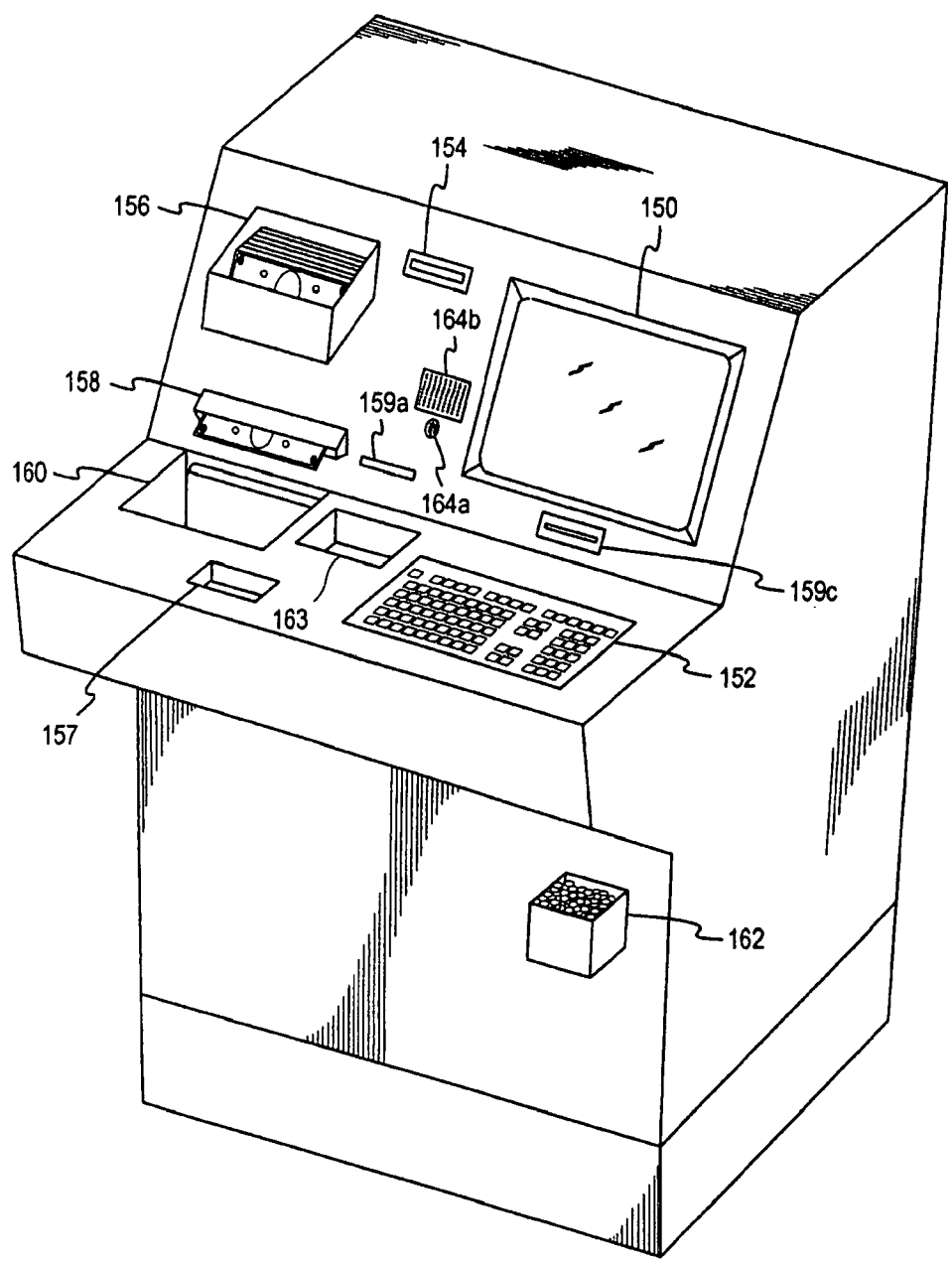
FIG. 11 is a perspective view of one embodiment of the processing system with a video screen and keyboard.

Reference is now made to FIG. 11. The communication panel displays information to the user and accepts user commands. The panel consists of a video screen 150 onto which information to the user is displayed by the system and a keyboard 152 for accepting commands from a user. The communications panel video screen 150 can comprise a touch screen. A slot 154 is used for receiving a user's identification card. The user inserts the card into the slot 154 to access the machine. The user deposits documents into bin 156. Loose currency is dispensed from slot 158, strapped currency from receptacle 160, and loose or rolled coin at receptacle 162.

Figure 12:
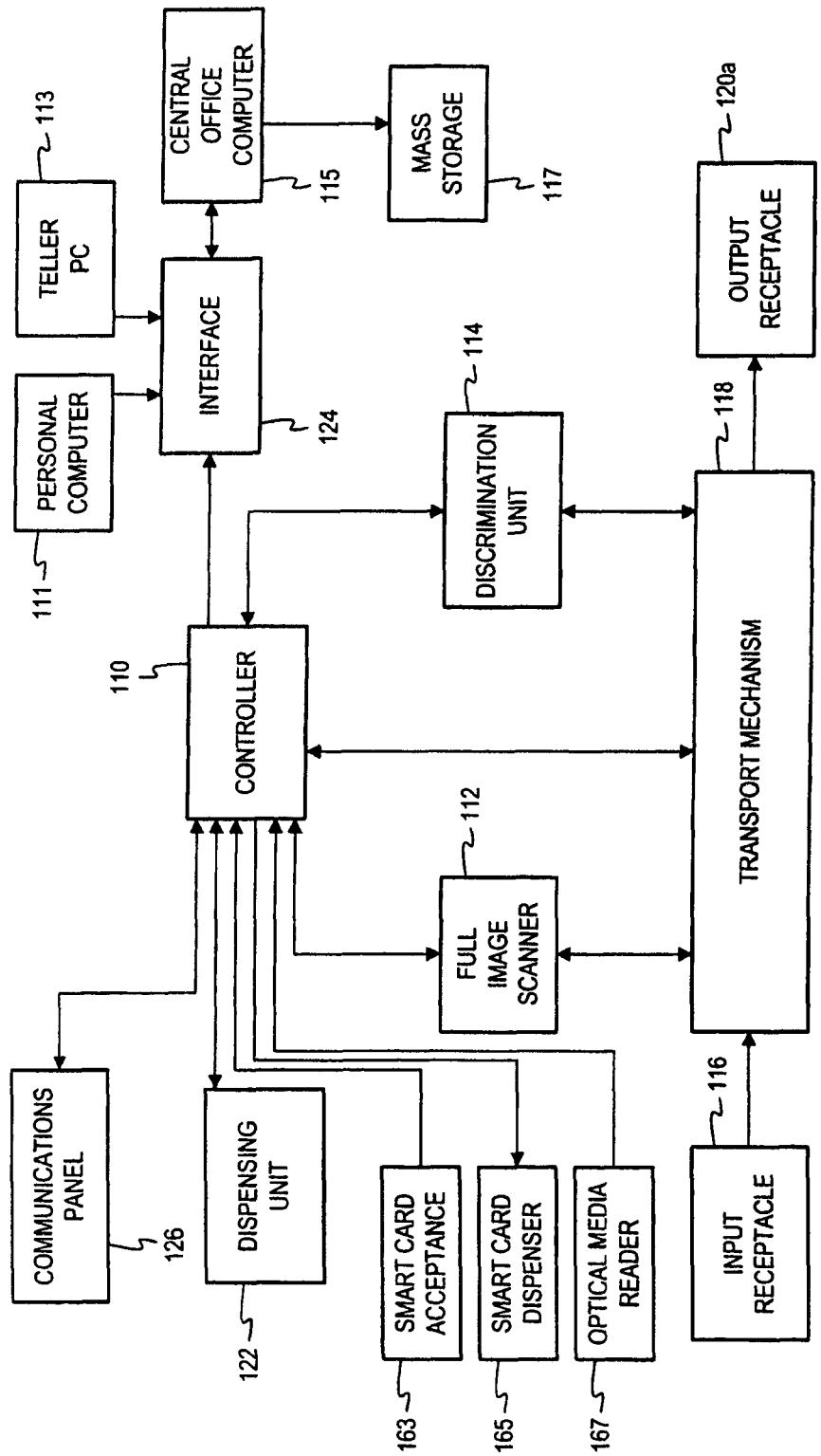
FIG. 12 is a block diagram of the document processing system with modules to insert smart cards, dispense smart cards, and insert optical media.

As shown in FIG. 12, other modules can be added to the system. A smart card acceptance module 163 is provided for accepting smart card. A smart card dispensing module 165 is provided for dispensing smart cards. An optical reader module 167 is also provided for accepting and dispensing optical media.

An audio microphone 164*a* and speaker 164*b* allow two-way communication between the user and a central office, for example, with a teller at a bank's central office. Thus, during the operating hours of a financial institution, bank personnel are connected to the system by the audio microphone 164*a* and speaker 164*b*. The central office computer 115 (which includes a video terminal) also receives and displays video images of the documents from the system. If the documents are not recognizable, the image is forwarded to the bank employee for observation on the terminal. The bank employee could then discuss the document with the customer. In this case, the bank employee could decide to accept the document immediately for credit after reviewing the image on the terminal. With an image scan, enough information may have been scanned on an unrecognizable document that review by the bank employee on the terminal will enable the bank employee to accurately call the value of the document. Additionally, the image of a document may be presented on a teller's monitor. By reviewing the data, the teller may be able to enter missing data via their keyboard, if the image is recognizable. If the teller is near the machine and an image on the monitor is unclear, the teller may remove the document from the scanner, inspect the document, and enter the missing data. The value could also be entered by the denomination keys and other information by a alphanumeric keypad, as described below, or with a mouse and applications software. Additionally, the value could be entered by a touch screen device or by any combination of the input means described above. The document would then be placed in back of the output receptacle 120 and processing would continue. In some situations, the customer might enter the value or other information concerning the unidentified documents. This entry would be via the keyboard and credit would be given to the customer's account only after the document is verified by bank personal. In other situations, the customer may merely hold onto the document.

A mentioned previously, the system has a slot for the insertion of a customer identification card. Alternatively, the customer might enter a PIN identification number through the keyboard. After identification of the customer is determined, then the customer submits a document (such as a check or savings account withdrawal slip) and immediate payment to the customer is made.

Figure 13:
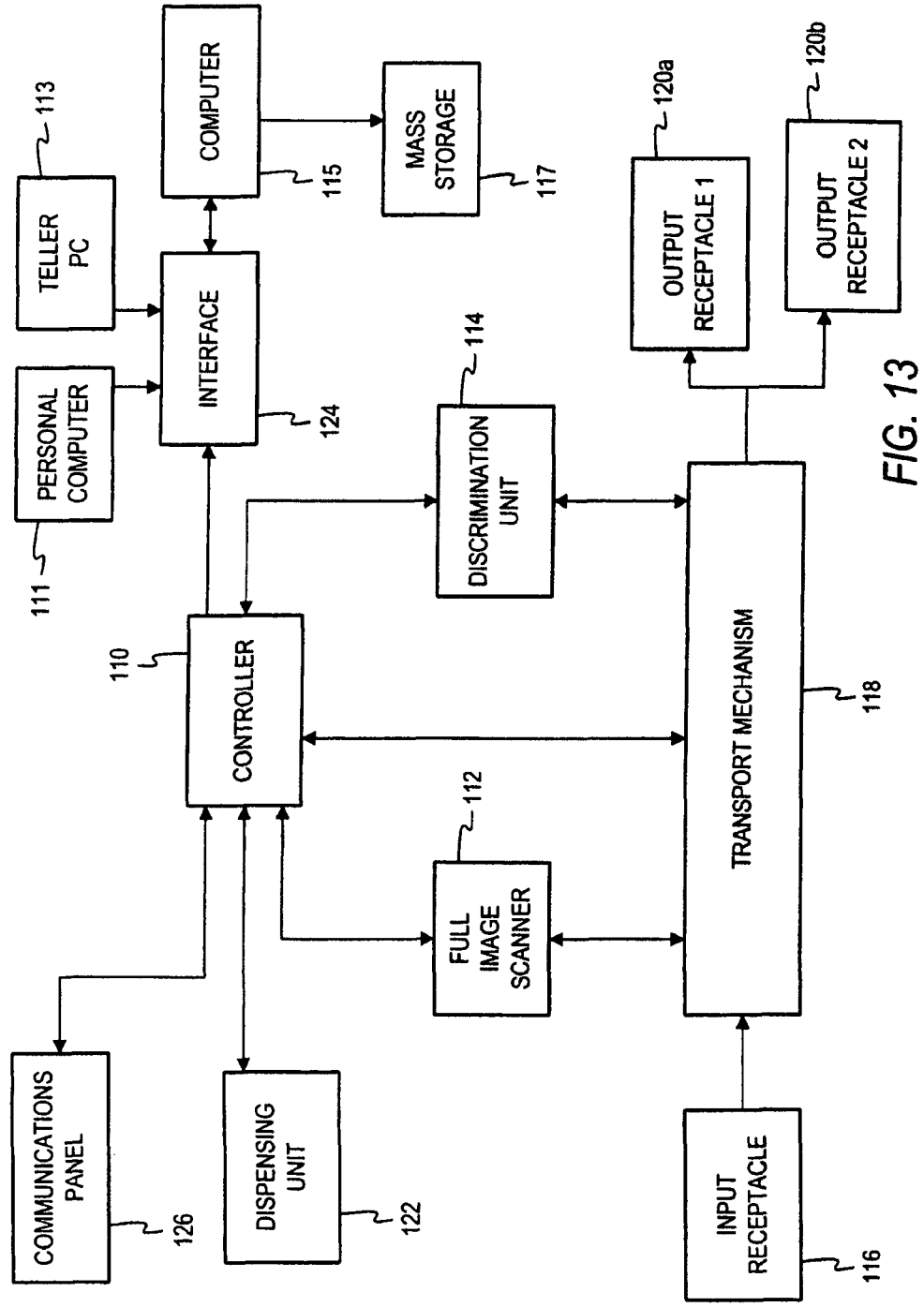
FIG. 13 is a block diagram of the document processing system with dual output bins.

The output receptacle 120 can be a single bin as shown in FIG. 7 into which all documents transported by the transport mechanism 118 are stored. Alternatively, the output receptacle 120 can consist of multiple bins (two or more) as shown in FIG. 13. In the case of dual bins, one type of documents (for example, identifiable documents, or certain value documents, or certain handling documents) are placed into the first bin and another type of documents (for example, unidentifiable documents, or other value documents, or other handling documents) are placed into the second bin. It will be understood that any number of output bins can be used to store the documents.

Figure 14:
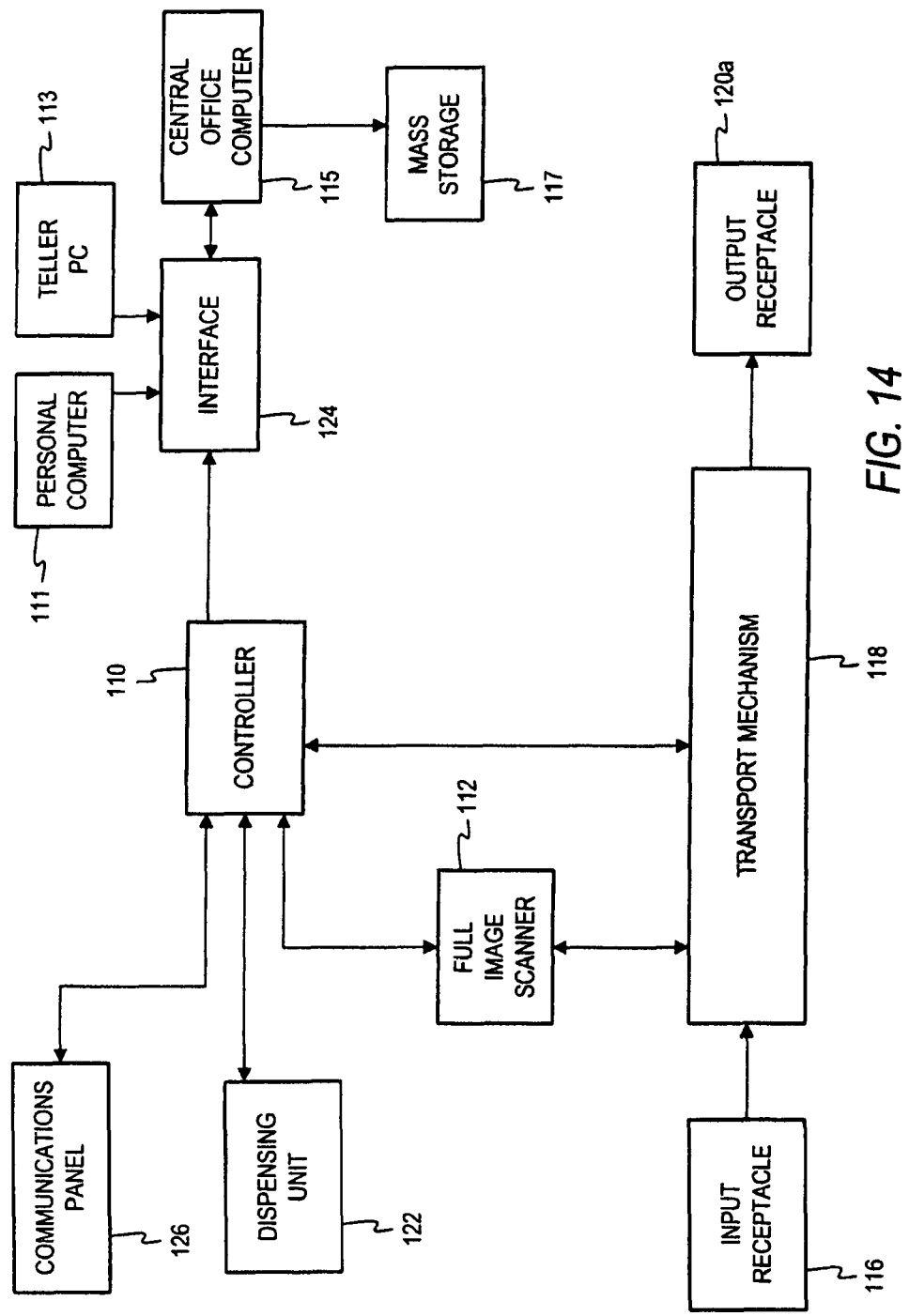
FIG. 14 is a block diagram of the document processing system without a discrimination unit.

As shown in FIG. 14, the image scanner can be used without the discrimination unit and one or more output receptacles.

Figure 15:
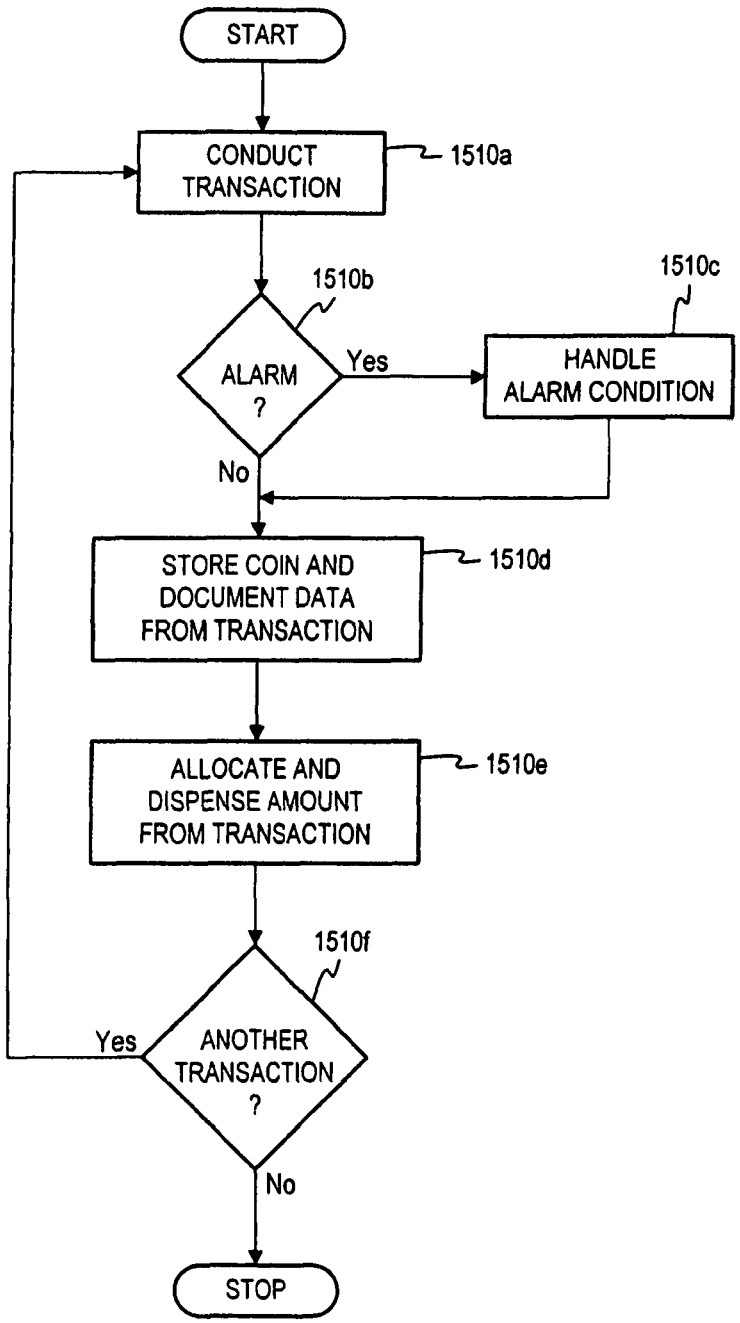
FIG. 15 shows a flowchart describing the operation of the document processing system.

The general operation of the automated document processing system is illustrated in FIG. 15. The user conducts a transaction at step 1510*a*. During the transaction step 1510*a*, the user places documents into the input receptacle 116, the image scanner 112 scans an image of the documents, selected parts of the image are processed by the image scanner 112, the discrimination and authentication unit 114 authenticates the document, and the document is placed in the output receptacle 120. During the transaction step 1510*a*, any interaction with personnel at a central office, for example, with a bank teller, occurs. As previously described, the system may also include a smart card processing module, modules which accept and read all forms of magnetic and optical media, and modules which dispense smart cards and all forms of optical and magnetic media.

An alarm condition may be generated during a transaction. At step 1510*b*, the system determines whether an alarm condition is present. If the answer is affirmative, then at step 1510*c* the system responds to the alarm condition. The response may be automatic or may require manual action by the user. If the response is automatic, the system preferably flashes a warning light, for example a 24 VAC external light driven by a relay. If the response required is manual, the user is required to perform some manual action and instructions of how to proceed may be displayed to the user on a user display screen, as described below. Alarm conditions occur when the user presses a help key; when a currency dispenser becomes empty; upon a system error condition; and when a bin is full.

If the answer to step 1510*b* is negative or upon completion of step 1510*c*, operation continues at step 1510*d*.

After the alarm condition is tested or handled, the amount deposited in the transaction is stored at step 1510*d* for later use. The values are preferably stored in a computer memory. Next, at step 1510*e*, a distribution is made of the deposited amount stored in step 1510*d*. Step 1510*e* can, for example, consist of receiving the deposited amount, allocating it to a savings account, or receiving part of the deposit back in bills and crediting the remainder to a bank savings account. At step 1510*f*, the user is given the choice of conducting a new transaction. If the answer is affirmative, the system returns to step 1510*a* which is described above. If the user answers in the negative, then the machine stops.

Figure 16:
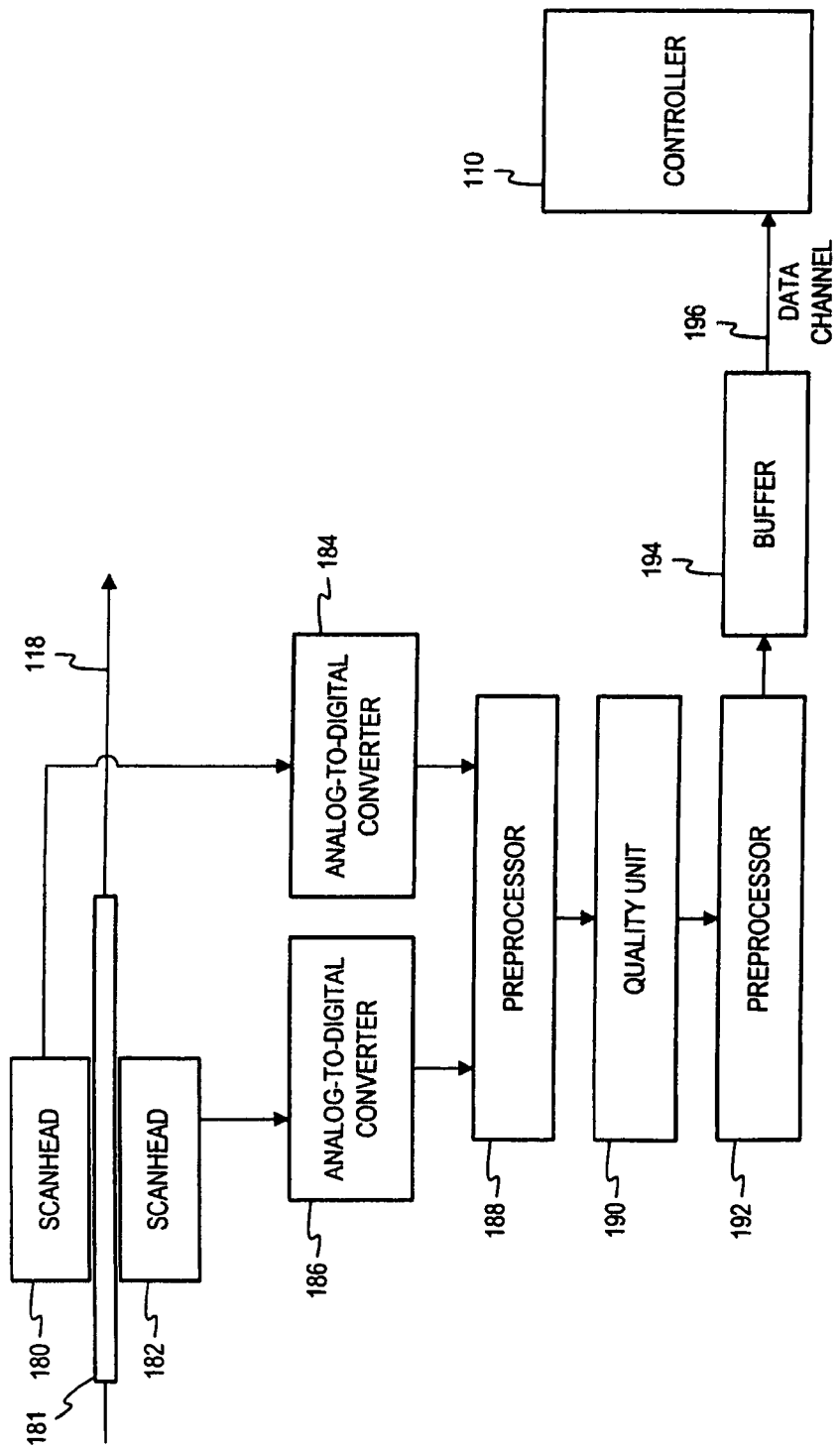
FIG. 16 is a block diagram of the full image scanner according to principles of the present invention.

An embodiment of the image scanner 112 is now described in detail. In accordance with the present invention, the image scanner may be of the type disclosed in U.S. Pat. No. 4,888,812 which is herein incorporated by reference in its entirety. As shown in FIG. 16, the front and back surfaces of the documents are scanned by scan heads 180 and 182 and the images processed into video image data by electronic circuitry. The scan heads 180 and 182 are preferably charge coupled scanner arrays and generate a sequence of analog signals representing light and dark images defining the image on the document. The scan heads 180 and 182 are arranged for simultaneously scanning both the front and back of the documents and are connected respectively to analog-to-digital converters 184 and 186 which convert the analog values into discrete binary gray scale values of, for example, 256 gray scale levels. The scan heads are capable of obtaining images of varying resolutions. The particular resolution chosen, which can be varied by the user, is selected based upon the type of document being scanned, as is known in the art.

The high resolution gray scale image data from the analog-to-digital converters 184 and 186 is directed to an image data preprocessor 188 in which the data may be enhanced and smoothed and which serves to locate the edges of successive documents and discard irrelevant data between documents. If the documents are slightly skewed, the image preprocessor 188 can also perform rotation on the image data to facilitate subsequent processing.

The image data is monitored for unacceptable image quality by image quality unit 190. For example, the image quality unit 190 and monitors the distribution of gray scale values in the image data and create a histogram. As is well known in the art, acceptable quality images have a distribution of gray scale values within certain prescribed limits. If the gray scale distribution of the histogram falls outside these limits, this is indicative of poor image quality and an error condition is generated.

The image data is transmitted from the quality unit 190 to the image processor 192. As is known in the art, the optical scanners can additionally scan specified fields on the faces of the document. For example, when processing checks, the scan head may search for the "$" symbol as a coordinate to the left of the numeric check amount field box. As is known in the art, a straight coordinate system or dimension system is used where known dimensions of the box are used to locate the field. The processor 192 can be programmed to locate fields for various types of documents perform processing as follows. Based on scanning certain areas on the document, the processor 192 first identifies the type of document. Then, based on the outcome of the previous step, certain fields of interest are located, and the information stored for use by the system. The processor 192 may also compresses the image data, as is known in the art, in preparation for transmission to an outside location.

The amount of image data per document may vary depending upon the size and nature of the document and the efficiency of the data compression and reduction for that particular document. To ensure that no data is lost in the event that the volume of image data may temporally exceed the transfer capacity of the high speed data channel, a prechannel buffer 194 interposed prior to the data channel, which is connected to the controller 110. The capacity of the pre-channel buffer 194 is continually monitored by the controller 110 so that appropriate action may be taken if the buffer becomes overloaded. The compressed video image data is received by the controller 110 over a high-speed data channel 196 and is initially routed to temporary storage. The image buffer is preferably of a size capable of storing the image data from at least several batches or runs of checks or similar documents. The controller 110 in the full image scanner performs the functions of analyzing the data. Alternatively, as discussed above, analysis of the data can occur at the central office computer 115 or at a personal computer 111 attached to the system.

A plurality of document processing systems may be connected in a "hub and spokes" network architecture as is known in the art. In order to prevent congestion, the image buffer on each document processing system stores data until polled by the central office computer or outside accounting system. When polled, the data is uploaded to the central office computer or accounting system.

Other scanning modules and methods can be used in place or in addition to the particular one described above. These include CCD array systems, multi-cell arrays and other well-known scanning techniques. Examples of these techniques and devices are described in U.S. Pat. No. 5,023,782; U.S. Pat. No. 5,237,158; U.S. Pat. No. 5,187,750; and U.S. Pat. No. 4,205,780 all of which are incorporated by reference in their entirety. The scanning module can also be a color image scanner such as the type described in U.S. Pat. No. 5,335,292 which is incorporated by reference in its entirety.

The discrimination and authentication unit may take on any one of a number of suitable forms. Reference is made to U.S. Pat. No. 6,363,164, the disclosure of which is hereby incorporated by reference, which teaches discrimination and authentication techniques and processes relating to currency bills in particular but which may be extended to the processing of other documents including checks.

In general, such discrimination and authentication units include more or more scanheads (for example, optical scanheads) that scans for characteristic information from a scanned document which can be used to identify the document type. One scanning technique directs a beam of coherent light onto the transport path so as to illuminate a substantially rectangular light strip upon a document positioned on the transport path below the scanhead. Light reflected off the illuminated strip is sensed by a photodetector positioned directly above the strip. The photodetector output signal is converted into a digital signal for processing. Other scanhead types include magnetic, optical, electrical conductivity, and capacitive sensors. The output signal provides an analog representation of measured characteristic variation (for example, reflected light). This variation serves as a measure for distinguishing and authenticating the document. For example, the variations can represent a characteristic pattern that is fairly unique for a given document provides sufficient distinguishing features among many characteristic patterns for different types of documents. An example of this process is described in U.S. Pat. No. 5,295,196. The processor is programmed to identify the document as corresponding to a set of stored intensity signal samples for which the correlation number resulting from pattern comparison is found to be the highest.

Two-sided scanning of documents may also be used.

In addition to scanned characteristic patterns, color may also be used to discriminate documents. Such color sensing may be achieved by, for example, incorporating color filters, colored light sources, and/or dichroic beamsplitters.

With respect to magnetic detection, the unit may be capable of reading and identifying all types of magnetic ink (such as "low dispersion" magnetic inks as used on checks; where "low dispersion" magnetic ink is magnetic ink mixed with color ink and used to print the background of checks as well as the name and address information on the check). Magnetic sample and variation data may be mathematically manipulated to simplify its use by summing data points to yield a checksum that is compared to expected values for genuine documents.

With respect to magnetic sensing, a variety of characteristics can be measured. These include detection of patterns of changes in magnetic flux (U.S. Pat. No. 3,280,974), patterns of vertical grid lines (U.S. Pat. No. 3,870,629), the presence of a security thread (U.S. Pat. No. 5,151,607), total amount of magnetizable material (U.S. Pat. No. 4,617,458), patterns from sensing the strength of magnetic fields (U.S. Pat. No. 4,593,184), and other patterns and counts from scanning different portions of the document (U.S. Pat. No. 4,356,473).

With regard to optical sensing, a variety of characteristics can be measured such as detection of density (U.S. Pat. No. 4,381,447), color (U.S. Pat. Nos. 4,490,846; 3,496,370; 3,480,785), length and thickness (U.S. Pat. No. 4,255,651), the presence of a security thread (U.S. Pat. No. 5,151,607) and holes (U.S. Pat. No. 4,381,447), and other patterns of reflectance and transmission (U.S. Pat. Nos. 3,496,370; 3,679,314; 3,870,629; 4,179,685). Color detection techniques may employ color filters, colored lamps, and/or dichroic beamsplitters (U.S. Pat. Nos. 4,841,358; 4,658,289; 4,716,456; 4,825,246, 4,992,860 and EP 325,364). An optical sensing system using ultraviolet light is described in U.S. Pat. No. 5,640,463.

In addition to magnetic and optical sensing, other techniques of detecting characteristic information include electrical conductivity sensing, capacitive sensing (U.S. Pat. No. 5,122,754 [watermark, security thread]; U.S. Pat. No. 3,764,899 [thickness]; U.S. Pat. No. 3,815,021 [dielectric properties]; U.S. Pat. No. 5,151,607 [security thread]), and mechanical sensing (U.S. Pat. No. 4,381,447 [limpness]; U.S. Pat. No. 4,255,651 [thickness]).

When checks are utilized in a transaction, the check is tagged with the customer checking account number, the bank number, and the Federal Reserve Region. If multiple banks are involved in the payment, each bank's number is tagged to the payment through an endorsement on the back of the check. Using the networks and systems described herein, tagging of the checks can be made electronically. In other words, the customer checking account number, bank number, and Federal Reserve region are electronically tagged to the check's image.

The accounting system processes information associated with checking accounts. The systems and networks described herein process checks and checking account-related documents by scanning an image thereof at a number of locations including the teller line, a drive-up window, an ATM. With the scanning and imaging of the check, the check need not be transmitted to a central location for processing. The accounting system maintains a record of all transactions regarding the checking account, balances, and tracks information associated with a particular check.

Again, documents can be immediately be scanned at point of entry without transporting the document to a central location. Information extracted from the imaged documents is sent to the accounting system where it is stored, monitored, and analyzed. The accounting system compiles statistics on customers and their accounts and maintains current balances, interest earnings, available funds, available advances, and records all information concerning deposits and withdrawals.

The accounting system also distributes funds between various accounts. The accounting system can make a withdrawal from an account to pay an invoice (such as a mortgage). To accomplish this, a customer may issue a check for payment and submit this against a coupon or invoice provided to the customer. The coupon and the check are processed by the systems and networks described herein to obtain document images. The information is read by the image scanner and transmitted to the accounting system which conducts the required transfers. Notably, a bank employee can run the check and coupon through the image scanner at any bank location—branch, central offices, payment center, etc. The document would not have to be forwarded to a centralized proof department for handling.

Another important service provided by the accounting system for business accounts is cash management. This can be provided by lock box services where a company has its customer payments directed to a bank "lock box." This lock box address is at a bank location and all customer payments to the company are diverted to this lock box address. This ensures that the payments are deposited as quickly as possible so that the bank's commercial customers have immediate use of the funds at the bank. The next day the outside accounting system at the bank advises the business which payments were received into the account and the business adjusts its accounts receivables balance one day later, creating a timing problem due to the delay.

The systems and networks described herein enable a business to scan the documents through the scanner at the business's location (thus, eliminating the need to first send payments to a bank lock box location) and receive immediate credit electronically through the accounting system located at the bank. The check images and other images would immediately be available via the accounting system at the bank for settlement purposes. Therefore, lock box services by banks are handled on a de-centralized basis at bank customer locations.

With the systems and networks described herein transactions involving checks are processed substantially immediately. That is, account adjustments are processed in real time rather than waiting for the end of the day. Also, images of all documents can be stored on mass storage devices at the central office. The images could also be stored at the unit itself, or at another remote system. The images could also be temporarily stored and forwarded at a later time.

In one embodiment, documents are transported, scanned, and identified at a rate in excess of 800 documents per minute. In another embodiment, documents are transported, scanned, and identified at a rate in excess of 1000 documents per minute.

Embodiment A

A system for processing checks, comprising an image processing device that receives a paper check, scans the received paper check to create a check image of at least one side of the paper check and obtains check information relating to the scanned paper check. The system further comprises a communications link over which the check image and obtained check information is communicated. The system further comprises an accounting system connected to the communications link and operable to update a financial account associated with the paper check in response to the obtained and communicated check information.

Embodiment B

A method for check processing, comprising receiving a paper check and scanning the received paper check to create a check image of at least one side of the paper check. The method further comprises obtaining check information relating to the scanned paper check and communicating the check image and obtained check information. The method further comprises updating a financial account associated with the paper check in response to the communicated check information.

Embodiment C

A check processing network, comprising a plurality of check imaging devices, each such device receiving paper checks, scanning the received paper checks to create check images of at least one side of the paper checks and obtaining check information relating to the scanned paper checks. The check processing network further comprises a financial institution accounting system operating to receive the check images and update financial accounts associated with the paper checks in response to the obtained check information. The check processing network further comprises a data communications network interconnecting the plurality of check imaging devices and the financial institution accounting system.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A system for electronically depositing checks comprising:
    a scanner adapted to scan and generate images of checks to be deposited into a customer's financial account associated with a financial institution having an accounting system, the scanner being located remote from the financial institution, the scanner being adapted to accept and process a stack of checks, the scanner further adapted to extract character data from the images, the character data indicative of informational content of the checks including checking account numbers; and
    means for sending the images of the checks to a network associated with the financial institution, the means for sending the images allowing the images to be immediately available to the financial institution for settlement by the accounting system such that the customer's financial account receives an immediate credit in real-time for the deposited checks.

2. The system of claim 1, wherein the means for sending includes sending an image file to the network associated with the financial institution, the image file containing image data and character data indicative of the informational content of said check.

3. The system of claim 1, wherein the means for sending includes sending the images of the checks substantially immediately to the network.

4. A table-top processing system for electronically depositing checks, said processing system comprising:
    a scanner configured to scan and generate an image of a check to be deposited into a customer's financial account associated with a financial institution having an accounting system, the scanner being located remote from the financial institution, the scanner further configured to extract character data from the image, the character data indicative of the informational content of the check including the check account number;
    a means for sending the image of the check to a network associated with the financial institution, the means for sending the image allowing the image to be immediately available to the financial institution for settlement by the accounting system such that the customer's financial account receives an immediate credit in real-time for the deposited check.

5. The table-top processing system of claim 4, wherein the means for sending includes sending an image file to the network associated with the financial institution, the image file containing image data and character data indicative of the informational content of said check.

6. The table-top processing system of claim 5, wherein the scanner is configured to accept and process a stack of checks, the checks each having a wide edge and a narrow edge, the wide edge having a dimension greater than the narrow edge, the checks being conveyed by a transport system with their narrow dimension parallel to the direction of conveyance, the transport system being at least partially disposed within the scanner.

7. The table-top processing system of claim 6, wherein the means for sending includes sending the image of the check substantially immediately to the network.

8. The table-top processing system of claim 4, wherein the scanner is configured to accept and process a stack of checks.

9. The table-top processing system of claim 4, wherein the scanner is configured to accept and process a stack of checks, the checks each having a wide edge and a narrow edge, the wide edge having a dimension greater than the narrow edge, the checks being conveyed by a transport system with their narrow dimension parallel to the direction of conveyance, the transport system being at least partially disposed within the scanner.

10. The table-top processing system of claim 4, wherein the means for sending includes sending the image of the check substantially immediately to the network.

11. A system for electronically depositing checks, the system comprising:
    a scanner configured to scan a check to be deposited into a customer's financial account associated with a financial institution, the scanner further configured to generate image data that is reproducible as an image of the check, the scanner being located remote from the financial institution; and
    a communications interface configured to send the image data in real-time to a network associated with the financial institution so that the image data is available substantially immediately at the financial institution for settlement purposes, said communications interface further configured to receive in real-time a confirmation that the customer's financial account has been credited for the deposited check, wherein the scanner is configured to extract character information from the image data, the character information indicative of the informational content of the check.

12. The system of claim 11, wherein the image data is included in an image file, the communications interface configured to send the image file in real time to the network associated with the financial institution.

13. The system of claim 11, wherein the image data and the extracted character information are combined into an image file, the communications interface being configured to send the image file in real time to the network associated with the financial institution.

14. The system of claim 13, wherein the scanner is configured to accept and process a stack of checks.

15. The system of claim 13, wherein the extracted character information includes a check amount.

16. The system of claim 13, wherein the extracted character information further includes one or more of MICR data, CAR data, or LAR data.

17. The system of claim 11, wherein the scanner is configured to accept and process a stack of checks.

18. The system of claim 17, wherein the checks each include a wide edge and a narrow edge, the wide edge having a dimension greater than the narrow edge, the checks being conveyed by a transport system with their narrow dimension parallel to the direction of conveyance, the transport system being at least partially disposed within the scanner.

19. The system of claim 11, wherein the scanner is configured to recognize fields associated with the image data of the checks, the character information being extracted from the fields.

20. The system of claim 11, wherein the scanner includes a user input panel configured to accept user commands.

21. The system of claim 11, wherein the extracted character information includes a check amount, account number, and bank number.

* * * * *